US011349656B2

(12) United States Patent
Tobias et al.

(10) Patent No.: US 11,349,656 B2
(45) Date of Patent: May 31, 2022

(54) SYSTEMS AND METHODS FOR SECURE STORAGE AND TRANSMISSION OF A DATA STREAM

(71) Applicant: UBIQ SECURITY, INC., San Diego, CA (US)

(72) Inventors: Eric Tobias, La Jolla, CA (US); Anthony Iasi, San Diego, CA (US); Charles Kahle, Escondido, CA (US); Gary Schneir, Carlsbad, CA (US); John Tyner, San Diego, CA (US)

(73) Assignee: UBIQ Security, Inc., San Diego, CA (US)

( * ) Notice: Subject to any disclaimer, the term of this patent is extended or adjusted under 35 U.S.C. 154(b) by 405 days.

(21) Appl. No.: 16/295,956

(22) Filed: Mar. 7, 2019

(65) Prior Publication Data

US 2019/0280865 A1 Sep. 12, 2019

Related U.S. Application Data

(60) Provisional application No. 62/640,493, filed on Mar. 8, 2018, provisional application No. 62/640,498, filed on Mar. 8, 2018.

(51) Int. Cl.
*H04L 9/14* (2006.01)
*H04L 9/08* (2006.01)
*H04L 9/00* (2022.01)

(52) U.S. Cl.
CPC .............. *H04L 9/14* (2013.01); *H04L 9/006* (2013.01); *H04L 9/0822* (2013.01); *H04L 9/0825* (2013.01)

(58) Field of Classification Search
CPC ......... H04L 9/14; H04L 9/0825; H04L 9/006; H04L 9/0822; H04L 9/0869; H04L 9/16; H04L 9/0894
See application file for complete search history.

(56) References Cited

U.S. PATENT DOCUMENTS 5,367,619 A 11/1994 Dipaolo et al.
5,563,998 A 10/1996 Yaksich et al.
(Continued)

FOREIGN PATENT DOCUMENTS

EP 1522947 A2 4/2005
GB 2514428 A 11/2014
(Continued)

OTHER PUBLICATIONS

NPL—Laserfiche, Quick Fields, Extract Value From Your Information, Compulink Management Center, Inc. 2009, 11 pages.
(Continued)

*Primary Examiner* — Abiy Getachew
(74) *Attorney, Agent, or Firm* — Scott H. Davison; Davison IP

(57) ABSTRACT

A system for authenticated communications between devices, the system comprising: a plurality of devices comprising at least a first and second device; and one or more communication pathways configured to communicatively couple the first and second devices for data streaming of a data object; and the first device comprising a memory coupled to at least one processor, the first device configured to: generate a plurality of datasets corresponding to a plurality of data fragments constituting the data object, each dataset comprising encryption keys used to encrypt the corresponding data fragments, encrypt a first dataset of the plurality of datasets using a first dataset key derived based, in part, on a first encryption algorithm, and determine a second dataset key based, in part, on at least one of the first encryption algorithm and second encryption algorithm.

28 Claims, 18 Drawing Sheets

(56) References Cited

U.S. PATENT DOCUMENTS

| | | |
|---|---|---|
| 5,664,109 A | 9/1997 | Johnson et al. |
| 5,924,069 A | 7/1999 | Kowalkowski et al. |
| 6,067,551 A | 5/2000 | Brown et al. |
| 6,088,700 A | 7/2000 | Larsen et al. |
| 6,192,380 B1 | 2/2001 | Light et al. |
| 6,247,029 B1 | 6/2001 | Kelley et al. |
| 6,651,217 B1 | 11/2003 | Kennedy et al. |
| 6,662,340 B2 | 12/2003 | Rawat et al. |
| 6,681,017 B1 | 1/2004 | Matias et al. |
| 6,820,204 B1 | 11/2004 | Desai et al. |
| 6,851,087 B1 | 2/2005 | Sibert |
| 6,941,291 B1 | 9/2005 | Zoller et al. |
| 7,092,952 B1 | 8/2006 | Wilens |
| 7,103,915 B2 | 9/2006 | Redlich et al. |
| 7,133,937 B2 | 11/2006 | Leavitt |
| 7,181,438 B1 | 2/2007 | Szabo |
| 7,203,699 B2 | 4/2007 | Bellamy |
| 7,216,292 B1 | 5/2007 | Snapper et al. |
| 7,299,240 B1 | 11/2007 | Crozier |
| 7,334,184 B1 | 2/2008 | Simons |
| 7,343,551 B1 | 3/2008 | Bourdev |
| 7,350,139 B1 | 3/2008 | Simons |
| 7,500,178 B1 | 3/2009 | O'Donnell |
| 7,676,526 B1 | 3/2010 | Beloussov et al. |
| 7,779,345 B2 | 8/2010 | Topalov et al. |
| 7,810,027 B2 | 10/2010 | Bendik |
| 7,917,545 B2 | 3/2011 | Mauceri et al. |
| 7,999,810 B1 | 8/2011 | Boice et al. |
| 8,019,664 B1 | 9/2011 | Tifford et al. |
| 8,082,144 B1 | 12/2011 | Brown et al. |
| 8,099,599 B2 | 1/2012 | Folta et al. |
| 8,260,806 B2 | 9/2012 | Steele et al. |
| 8,327,141 B2 | 12/2012 | Vysogorets et al. |
| 8,386,706 B2 | 2/2013 | Koeppe et al. |
| 8,407,224 B2 | 3/2013 | Bach et al. |
| 8,489,643 B1 | 7/2013 | Rubanovich et al. |
| 8,639,920 B2 | 1/2014 | Stack et al. |
| 8,649,521 B2 | 2/2014 | Grube et al. |
| 8,661,045 B2 | 2/2014 | Raz et al. |
| 8,676,683 B2 | 3/2014 | Chheda et al. |
| 8,782,437 B2 | 7/2014 | Rashkovskiy et al. |
| 9,087,212 B2 | 7/2015 | Balakrishnan et al. |
| 9,158,927 B1 | 10/2015 | Franklin et al. |
| 9,165,160 B1 | 10/2015 | Tidd |
| 9,268,758 B2 | 2/2016 | Gonser et al. |
| 9,292,484 B1 | 3/2016 | Plow et al. |
| 9,455,963 B1 | 9/2016 | Roth et al. |
| 9,590,989 B2 | 3/2017 | Spagnola |
| 9,665,638 B2 | 5/2017 | Eigner et al. |
| 9,672,336 B1 | 6/2017 | Spence |
| 9,842,097 B2 | 12/2017 | Selig |
| 9,842,227 B2 | 12/2017 | Eigner et al. |
| 10,298,556 B2 | 5/2019 | Iasi et al. |
| 2001/0047381 A1 | 11/2001 | Meno et al. |
| 2002/0049686 A1 | 4/2002 | Chuang et al. |
| 2002/0049689 A1 | 4/2002 | Venkatram |
| 2002/0062342 A1 | 5/2002 | Sidles |
| 2002/0082997 A1 | 6/2002 | Kobata et al. |
| 2002/0111888 A1 | 8/2002 | Stanley et al. |
| 2002/0156846 A1 | 10/2002 | Rawat et al. |
| 2002/0194062 A1 | 12/2002 | Linde |
| 2003/0014528 A1 | 1/2003 | Crutcher et al. |
| 2003/0028792 A1 | 2/2003 | Plow et al. |
| 2003/0130951 A1 | 7/2003 | Chess et al. |
| 2003/0204602 A1 | 10/2003 | Hudson et al. |
| 2003/0233316 A1 | 12/2003 | Hu et al. |
| 2004/0049700 A1 | 3/2004 | Yoshida |
| 2005/0028082 A1 | 2/2005 | Topalov et al. |
| 2005/0050052 A1 | 3/2005 | Zimmerman et al. |
| 2005/0071342 A1 | 3/2005 | Calusinski |
| 2005/0198563 A1 | 9/2005 | Kristjansson |
| 2005/0257148 A1 | 11/2005 | Goodman et al. |
| 2006/0023875 A1 | 2/2006 | Graunke |
| 2006/0168509 A1 | 7/2006 | Boss et al. |
| 2006/0194186 A1 | 8/2006 | Nanda |
| 2007/0033118 A1 | 2/2007 | Hopkinson |
| 2007/0061393 A1 | 3/2007 | Moore |
| 2007/0078885 A1 | 4/2007 | Klein |
| 2007/0113078 A1 | 5/2007 | Witt et al. |
| 2007/0143261 A1 | 6/2007 | Uppala |
| 2007/0154018 A1 | 7/2007 | Watanabe |
| 2007/0198854 A1 | 8/2007 | Suzuki |
| 2007/0208665 A1 | 9/2007 | Ohara |
| 2007/0250348 A1 | 10/2007 | D'Ambrosia et al. |
| 2007/0256005 A1 | 11/2007 | Schneider et al. |
| 2008/0022012 A1 | 1/2008 | Wang |
| 2008/0071786 A1 | 3/2008 | Swanburg et al. |
| 2008/0098226 A1 | 4/2008 | Yokumasui |
| 2008/0120257 A1 | 5/2008 | Goyal et al. |
| 2008/0126357 A1 | 5/2008 | Casanova et al. |
| 2008/0155664 A1 | 6/2008 | Lieber |
| 2008/0215976 A1 | 9/2008 | Bierner et al. |
| 2008/0235567 A1 | 9/2008 | Raj et al. |
| 2009/0006646 A1 | 1/2009 | Duarte |
| 2009/0006940 A1 | 1/2009 | Hardt |
| 2009/0030910 A1 | 1/2009 | Bennett et al. |
| 2009/0161870 A1 | 6/2009 | Rosenberg |
| 2009/0222412 A1 | 9/2009 | Lee et al. |
| 2009/0254971 A1 | 10/2009 | Herz et al. |
| 2009/0327321 A1 | 12/2009 | McCormack et al. |
| 2010/0049774 A1 | 2/2010 | Pathak et al. |
| 2010/0058061 A1 | 3/2010 | Folta et al. |
| 2010/0088269 A1 | 4/2010 | Buller et al. |
| 2010/0125794 A1 | 5/2010 | Hampton |
| 2010/0217684 A1 | 8/2010 | Melcher et al. |
| 2010/0241518 A1 | 9/2010 | McCann |
| 2010/0245938 A1 | 9/2010 | Coley et al. |
| 2010/0274590 A1 | 10/2010 | Compangano et al. |
| 2010/0293108 A1 | 11/2010 | Gurvitch et al. |
| 2011/0066843 A1 | 3/2011 | Newman et al. |
| 2011/0071994 A1 | 3/2011 | Tabrizi |
| 2011/0093471 A1 | 4/2011 | Brockway et al. |
| 2011/0145101 A1 | 6/2011 | Berger et al. |
| 2011/0153588 A1 | 6/2011 | Gartner et al. |
| 2011/0191114 A1 | 8/2011 | Bhagwan et al. |
| 2011/0282941 A1 | 11/2011 | Chan et al. |
| 2011/0289010 A1 | 11/2011 | Rankin, Jr. et al. |
| 2012/0047100 A1 | 2/2012 | Lehner |
| 2012/0059842 A1 | 3/2012 | Hille-Doering et al. |
| 2012/0066223 A1 | 3/2012 | Schentrup et al. |
| 2012/0203733 A1 | 8/2012 | Zhang |
| 2012/0227096 A1 | 9/2012 | Edwards |
| 2012/0323574 A1 | 12/2012 | Wang et al. |
| 2012/0331088 A1 | 12/2012 | O'Hare et al. |
| 2013/0067243 A1 | 3/2013 | Tamayo-Rios et al. |
| 2013/0151866 A1 | 6/2013 | Koeppe et al. |
| 2013/0173553 A1 | 7/2013 | Apte et al. |
| 2013/0205189 A1 | 8/2013 | DiPierro et al. |
| 2013/0227352 A1 | 8/2013 | Kumarasamy et al. |
| 2013/0232038 A1 | 9/2013 | Murray |
| 2013/0290648 A1 | 10/2013 | Shao et al. |
| 2013/0318347 A1 | 11/2013 | Moffat |
| 2013/0326117 A1 | 12/2013 | Aune |
| 2013/0332804 A1 | 12/2013 | Seaman et al. |
| 2014/0032228 A1 | 1/2014 | Johri et al. |
| 2014/0082073 A1 | 3/2014 | Wable et al. |
| 2014/0122988 A1 | 5/2014 | Eigner et al. |
| 2014/0123057 A1 | 5/2014 | Eigner et al. |
| 2014/0149470 A1 | 5/2014 | Rawal |
| 2014/0173282 A1 | 6/2014 | Pascariello et al. |
| 2014/0201520 A1 | 7/2014 | Yacobi |
| 2014/0201824 A1 | 7/2014 | Agbabian |
| 2014/0223575 A1 | 8/2014 | Nandi et al. |
| 2014/0244317 A1 | 8/2014 | Roberts et al. |
| 2014/0250534 A1 | 9/2014 | Flores |
| 2014/0279286 A1 | 9/2014 | Ganesh et al. |
| 2014/0279893 A1 | 9/2014 | Branton |
| 2014/0310525 A1 | 10/2014 | Kohlenberg et al. |
| 2014/0331060 A1 | 11/2014 | Hayton |
| 2015/0052354 A1 | 2/2015 | Purohit |
| 2015/0121063 A1 | 4/2015 | Mailer et al. |
| 2015/0123057 A1 | 5/2015 | Ogden |
| 2015/0213195 A1 | 7/2015 | Bleechman |
| 2015/0244693 A1 | 8/2015 | Pate et al. |

(56) References Cited

U.S. PATENT DOCUMENTS

| | | | |
|---|---|---|---|
| 2015/0294118 A1 | 10/2015 | Parker et al. |
| 2015/0371052 A1 | 12/2015 | Lepeshenkov et al. |
| 2015/0371226 A1 | 12/2015 | Hurley et al. |
| 2016/0085996 A1 | 3/2016 | Eigner et al. |
| 2016/0173605 A1 | 6/2016 | Iasi et al. |
| 2016/0211976 A1 | 7/2016 | Paris et al. |
| 2017/0102898 A1 | 4/2017 | Shimizu |
| 2017/0163419 A1 | 6/2017 | Stuntebeck et al. |
| 2017/0208050 A1 | 7/2017 | Iasi et al. |
| 2017/0208052 A1 | 7/2017 | Jai et al. |
| 2017/0250807 A1 | 8/2017 | Brannon |
| 2017/0359717 A1 | 12/2017 | Adler et al. |
| 2018/0091538 A1 | 3/2018 | Narayanan et al. |
| 2018/0176017 A1 | 6/2018 | Rodriguez et al. |
| 2018/0181964 A1 | 6/2018 | Zagarese et al. |

FOREIGN PATENT DOCUMENTS

| | | | |
|---|---|---|---|
| JP | 2008139996 A | 6/2008 |
| KR | 1020110139798 A | 12/2011 |
| KR | 10-2013-0108679 A | 10/2013 |
| KR | 101441581 A | 9/2014 |
| KR | 101520722 A | 5/2015 |
| KR | 10-2017-0085020 A | 7/2017 |
| KR | 10-2017-0110420 A | 10/2017 |
| WO | 2001006416 A2 | 1/2001 |
| WO | 2006081122 A2 | 8/2006 |
| WO | 2007085824 A2 | 8/2007 |
| WO | 2008065342 A1 | 6/2008 |
| WO | 2013127877 A1 | 9/2013 |
| WO | 2013149178 A2 | 10/2013 |

OTHER PUBLICATIONS

Bownik, Assited Form Filing, pp. 41-65, 2009.

EP Search for EP Application No. 13850795.9 dated May 24, 2016, 7 pages.

PCT International Search Report and Written Opinion from corresponding application PCT/US2013/067610 dated Feb. 26, 2014 (14 pages).

PCT IPRP from corresponding application PCT/US2013/067610 dated May 5, 2015 (12 pages).

PCT International Search Report from corresponding application PCT/US2015/041210 dated Oct. 30, 2015 (14 pages).

PCT International Search Report from corresponding application PCT/US2015/051782, dated Jan. 4, 2016 (11 pages).

PCT International Search Report from corresponding application PCT/US2015/065911, dated Mar. 30, 2016 (14 pages).

PCT International Search Report from corresponding application PCT/US2017/014451, dated Apr. 17, 2017 (8 pages).

PCT IRPR from related application PCT/US2017/014451 dated Aug. 2, 2018 (7 pages).

PCT International Search Report from corresponding application PCT/US2018/037328 dated Sep. 21, 2017 (3 pages).

PCT Written Opinion/IRPR from corresponding application PCT/US2018/037328 dated Dec. 27, 2018 (18 pages).

PCT International Search Report and Written Opinion from corresponding application PCT/US2018/037388 dated Jan. 16, 2019 (12 pages).

PCT Written Opinion from corresponding application PCT/US2018/054235 dated Feb. 26, 2019 (12 pages).

PCT Written Opinion from corresponding application PCT/US2019/021438 dated Jun. 20, 2019 (11 pages).

PCT Written Opinion from corresponding application PCT/US2019/021440 dated Jun. 21, 2019 (10 pages).

PCT Written Opinion from corresponding application PCT/US2019/021453 dated Jun. 26, 2019 (12 pages).

Extended EP Search for EP Application No. 15844963.7, dated Apr. 10, 2018 (7 pages).

Extended EP Search for EP Application No. 1570918.8, dated Aug. 17, 2018 (18 pages).

Supplementary EP Search for EP Application No. 15870918, dated May 11, 2018 (17 pages).

Amihai Motro and Francesco Parisi-Presicce, "Blind Custodians: A Database Service Architecture That Supports Privacy Without Encryption," Data and Applications Security XIX, copyright 2005, pp. 338-352.

International Search Report and Written Opinion for related PCT Patent Application No. PCT/US2019/021462 dated Jun. 17, 2019; (14 pages).

Extended EP Search for EP Application No. 17813970.5 dated Nov. 4, 2019 (8 pages).

Https://github.com/kohana/cascading-filesystem (Year: 2015) (4 pages).

1230

1232a F2017021214000/
1234a dagrmSERVTASF4558
1234b weVRVDBybu7indtyund
1234n-1 234sdfgLKGUBSRMMR
1234n asueIBERTNU867YNSY
1232b F20170212114500
  ijhgSbmSERVTASF4558
  KASjGrEybu/indtyund
  DFGsdfgLKGUBSRMMR
  754wtBERTNU867YNSY 1232n F20170212115500
  cnchAETA81
  ERYBY^UGbit7indtyund
  awctnZTKGUBSRMMR
  67SfTlnusxfg867YNSY

SYSTEMS AND METHODS FOR SECURE STORAGE AND TRANSMISSION OF A DATA STREAM

CROSS-REFERENCE TO RELATED APPLICATIONS

This application claims the benefit of U.S. Provisional Application No. 62/640,493, filed Mar. 8, 2018, and U.S. Provisional Application No. 62/640,498, filed Mar. 8, 2018, the disclosures of which are each incorporated herein in its entirety by reference.

This application is related to U.S. application Ser. No. 15/622,033, filed on Jun. 13, 2017, which is a continuation-in-part of U.S. application Ser. No. 15/605,860, filed on May 25, 2017, which is a continuation of U.S. application Ser. No. 14/061,736, filed on Oct. 23, 2013, now U.S. Pat. No. 9,665,638, which claims priority to U.S. Provisional Application No. 61/857,177, filed on Jul. 22, 2013, 61/720,907, filed on Oct. 31, 2012, 61/720,916, filed on Oct. 31, 2012, 61/720,309, filed on Oct. 30, 2012, and 61/720,305, filed on Oct. 30, 2012, the disclosures of which are each incorporated herein in its entirety by reference. This application is also related to U.S. Provisional Application No. 62/349,567, filed Jun. 13, 2016, and U.S. Provisional Application No. 62/350,646, filed Jun. 15, 2016, the disclosures of which are each incorporated herein in its entirety by reference.

BACKGROUND

1. Field of the Invention

Various embodiments described herein relate generally to the field of electronic data security and more particularly to the secure storage, management, and transmission of data, credentials and encryption keys at a client endpoint and during transmission.

2. Related Art

The vision of a paperless modern society is quickly becoming a reality, as more and more communications, services and transactions take place digitally across networks such as the Internet. The need for paper copies of correspondence, financial documents, receipts, contracts and other legal instruments is dwindling as electronic methods for securely transmitting, updating and accessing these documents increases. In addition to the electronic transmission and access to documents and correspondence, the process of electronically submitting information is also commonplace, such as with online shopping or applications for loans, credit cards, health insurance, college or job applications, etc.

Security of electronic data is of paramount importance for private individuals and for almost every conceivable business and government entity. A tremendous volume of electronic data is being generated, stored, and transmitted on a constant basis. Moreover, the breadth of electronic data, which nowadays inevitably extends to private and sensitive information, necessarily attracts a host of bad actors.

Conventional data security solutions are relatively static. For example, one or more data security mechanisms (e.g., password protection, encryption scheme) may be deployed at a particular data storage location. The same data security mechanisms will generally remain in place until a significant security breach is detected, at which point the entire data storage location may have already been compromised.

Data that have been stored based on standard relational data models are particularly vulnerable to unauthorized access. Individual data records (e.g., name, address, social security number, credit card number, and bank account number) stored in separate storage locations are typically accompanied by a common record locator indicating a logical *nexus* between the data records (e.g., associated with the same user). For example, individual data records may each be associated with the same user identification number. As such, unauthorized access to any one data record may expose sufficient information (i.e., the user identification number) to gain access to the remainder of the data records.

Although numerous data security methods are available, implementing a flexible roster of seamlessly integrated and complementary data security solutions at a single data storage location remains an enormous challenge. For example, while combining security solutions will normally increase data security, incompatibilities between different solutions may in fact give rise to additional security risks.

Moreover, in order for a user to be able to store and retrieve data, there must be a way to identify that user and protect their data from being accessed by any other user. Traditionally, this is performed by "front-end" software where the user is authenticated and authorized through a login process.

The conventional login process is associated with a number of documented weaknesses. For example, in many systems, the login step is commonly considered a part of the user interface (UI) and a separate entity from the security bubble. The problem is magnified in cases where in-house developers, having limited background in security, attempt to build custom login authentication and authorization systems. As such, a malicious user can potentially have access to other users' data once that user successfully completes the login process.

But these issues are also exacerbated by the fact that much of the data that is created today is created or accessed at a client endpoint, e.g., a computer, laptop, smartphone, tablet, Internet of Things device, etc. Even if the issues described above can be solved for data stored and retrieved at a server, there is the additional problem of securing the data at the endpoint. Thus, any solution to the above issues should take into account the fact that the client endpoint must also be secured.

Key Exchange Methodologies

There are many forms of key exchange methodologies in current use for establishing a trusted communication link between two devices and to encrypt/decrypt transmitted data such as through symmetric shared secret keys or public/private asymmetric keys. Symmetric encryption uses the same key for both encrypting and decrypting data through any number of algorithms such as AES, Blowfish, DES, and Skipjack and is typically faster than asymmetric encryption. It is often used for bulk data encryption and when high rates of data throughput are necessary. In contrast, asymmetric encryption utilizes a pair of keys, public and private, where a public key is typically used to encrypt the data and the private key is used to decrypt the data. Asymmetric key algorithms can be 1000 times slower than symmetric key algorithms and therefore more commonly applied to key management or initial device authentication where there is not a continuous exchange of key pairs which would require enormous resource capability.

Encrypted Data Transmission

In a common scenario where a large object needs to be sent encrypted to multiple client destinations and each client should have a uniquely encrypted copy, the traditional approach is to encrypt the original object using a different key for each client. If there are N clients and it takes an amount of time T to encrypt each object, the total encryption time is N×T.

Data Encryption Speed

Currently, there are several approaches to increase performance (speed at which data can be encrypted). One approach is by using hardware-based acceleration. 128 bit and 256-bit AES ciphers can be accelerated 4 to 8 times through AES-NI hardware encryption (where available on Intel and AMD processors). It is also possible to decrease the key size at the expense of security. AES with 256-bit keys is about 40% slower than AES with 128-bit keys. Another tactic is to use alternative encryption algorithms such as Blowfish which can produce a 20% speed improvement.

Encryption Key Management

Encryption keys are typically used to encrypt data or to encrypt other keys which are then used to encrypt data, the later commonly known as Key Encryption Keys (KEK). Managing keys and who has access to keys can be a daunting task. Key Management Software (KMS) attempts to make this job easier by providing user and administration access to all of the necessary keys. A KMS may also provide backup and redundancy services to safeguard a copy of the keys in case of a catastrophic server failure. User uptime is maintained when a replacement KMS is spun up quickly since access to encrypted data will not be possible unless the KMS is constantly up.

Data Encryption

Data is traditionally encrypted while in any number of states. For example, an entire hard-drive may be encrypted for data-at-rest. In another example, data-in-motion may be encrypted as it travels through a secure https connection. Data in databases may also be encrypted using methods where data in individual fields are encrypted in place while preserving the original table format. Other ad-hoc scenarios include encrypting single desktop folders or mounted disk drives.

In all these cases, the data to be encrypted is not organized into a format that is much different from their original footprint. The encrypted data merely replaces the original data in-place, or if replicated to other media, transferred to storage using a similar data and file hierarchy as the original data. Other techniques exist which do reorganize the data storage format, such as in the case with Data Sharding and Erasure Coding algorithms. These distribute the original data and that data may also be encrypted. However, the distribution and storage formats follow a rigid protocol imposed by the underlying algorithm thereby making it difficult to apply higher level capabilities and integration with existing legacy formats and/or third-party solutions.

SUMMARY

Disclosed herein are systems and methods for secure storage, transmission and management of data, credentials and encryption keys to and from the client endpoint. According to one aspect, a method for secured communications between devices is provided. The method comprises: establishing communications for data streaming of a data object between a first device and a second device; receiving, at the second device, a plurality of datasets encrypted based on a first dataset key derived based, in part, on a first encryption algorithm, each encrypted dataset comprising encryption keys used to encrypt corresponding data fragments constituting the data object; decrypting a first encrypted dataset of the plurality of datasets using the first dataset key to retrieve encryption keys for decrypting corresponding data fragments; evaluating key regeneration criteria to determine whether the first dataset key should be regenerated for a second encrypted dataset of the plurality of encrypted datasets; in response to determining that the dataset key should not be regenerated, determining a second dataset key based, in part, on a second encryption algorithm; and decrypting the second encrypted dataset using the second dataset key to retrieve unique encryption keys for decrypting corresponding data fragments.

In another aspect, a method for secured communications between devices is provided. The method comprises: establishing communications for data streaming of a data object between a first device and a second device; generating, by the first device, a plurality of datasets corresponding to a plurality of data fragments constituting the data object, each dataset comprising encryption keys used to encrypt the corresponding data fragments; encrypting a first dataset of the plurality of datasets using a first dataset key derived based, in part, on a first encryption algorithm; evaluating key regeneration criteria to determine whether the first dataset key should be regenerated for a second encrypted dataset of the plurality of encrypted datasets; and in response to determining that the first dataset key should not be regenerated, determining a second dataset key based, in part, on a second encryption algorithm.

In another aspect, a system for authenticated communications between devices is provided. The system comprises a plurality of devices comprising at least a first and second device; and one or more communication pathways configured to communicatively couple the first and second devices for data streaming of a data object. The first device comprises a memory coupled to at least one processor, the first device configured to: generate a plurality of datasets corresponding to a plurality of data fragments constituting the data object, each dataset comprising encryption keys used to encrypt the corresponding data fragments, encrypt a first dataset of the plurality of datasets using a first dataset key derived based, in part, on a first encryption algorithm, and determine a second dataset key based, in part, on at least one of the first encryption algorithm and second encryption algorithm.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

FIG. 12 illustrates example data structures for storing data fragments and manifests in accordance with various aspects of the present disclosure;

The various embodiments mentioned above are described in further detail with reference to the aforementioned figures and the following detailed description of exemplary embodiments.

DETAILED DESCRIPTION

Embodiments disclosed herein provide methods and systems for secure storage and management of data, credentials and encryption keys, specifically including client endpoint protection. After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

U.S. patent application Ser. No. 14/863,294 (the '294 application), the disclosure of which is incorporated herein by reference in its entirety as if set forth in full, describes systems and methods for secure high-speed data storage, access, recovery and transmission that involves fragmenting, individually encrypting and dispersing of the data as described therein. For example, as described in the '294 application, data in a medical record can first be disassociated so that, e.g., the various fields are not logically related. Then the disassociated fields can be decomposed into sub-fields or parts (fragments). These sub-fields can then be obfuscated such that one cannot easily determine the contents of the sub-fields, even if they were to intercept or gain access to them. These sub-fields can then be individually encrypted, e.g., using a different encryption key for each sub field or fragment. The individually encrypted, sub-fields can then be "sharded" and stored on different storage devices or locations.

Figure 1:
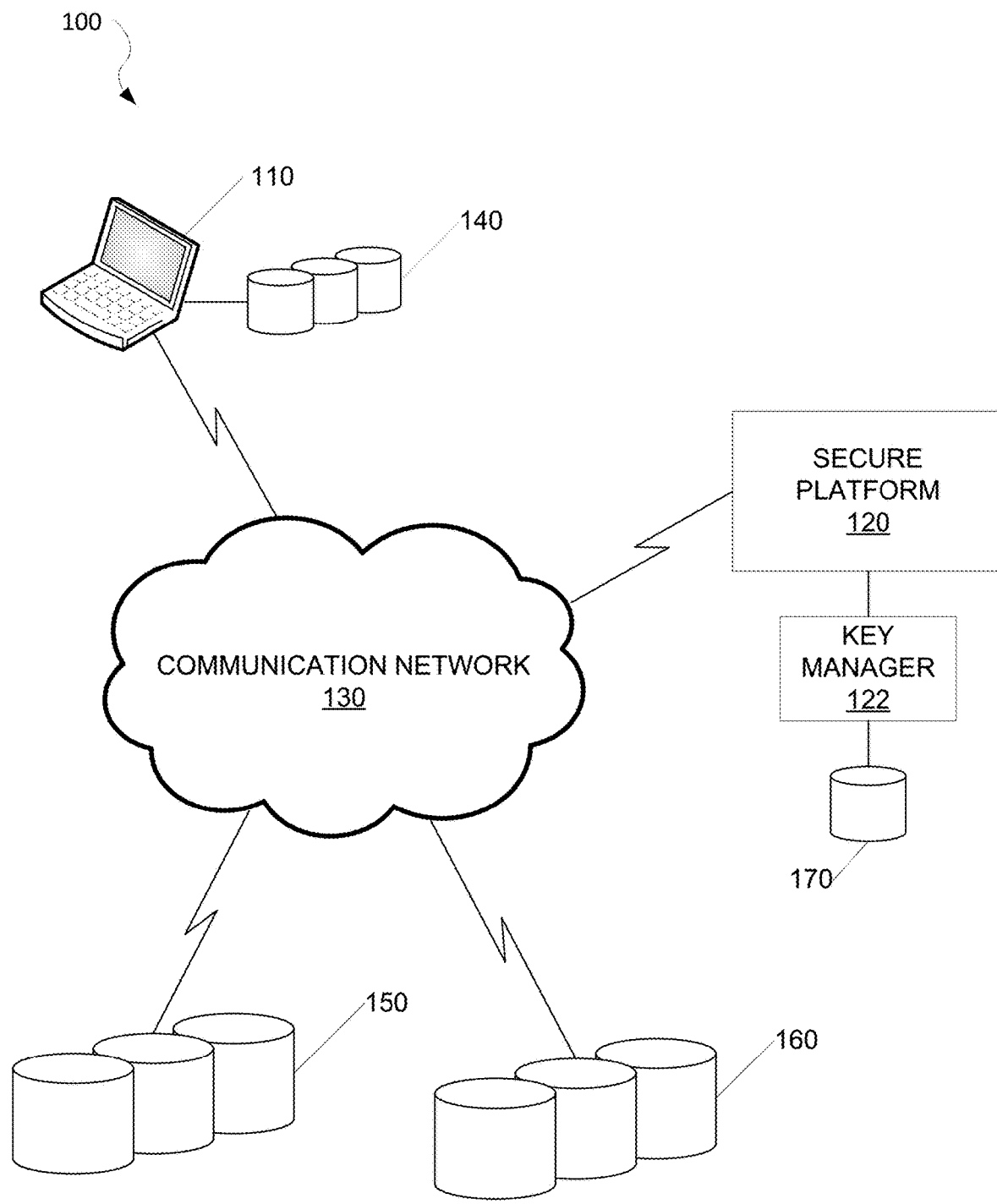
FIG. 1 is a reproduction of FIG. 1 of U.S. application Ser. No. 14/863,294, the disclosure of which application is incorporated herein in its entirety by reference.

FIG. 1 is a reproduction of FIG. 1 of the '294 application that illustrates an example system on which the process described can be carried out. As described, with reference to FIG. 1, the process generally occurs on secure platform 120 in response to a command or request initiated on client device, or endpoint 110. The secure platform 120 then stores the encrypted fragments on various storage devices or locations 140-170.

Figure 2:
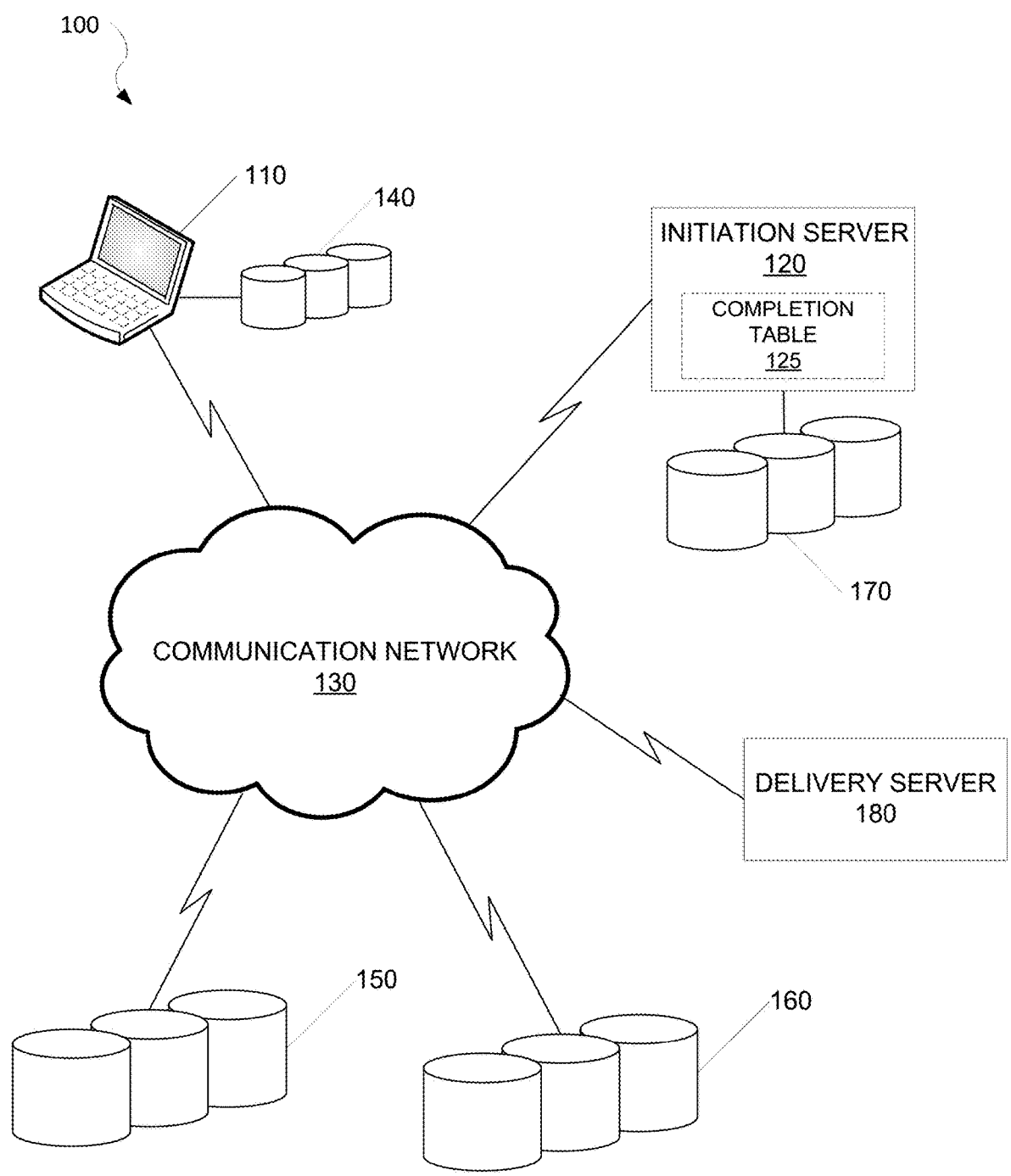
FIG. 2 is a reproduction of FIG. 1 of U.S. application Ser. No. 14/970,466, the disclosure of which application is incorporated herein in its entirety by reference.

U.S. patent application Ser. No. 14/970,466 (the '466 application), the disclosure of which is incorporated herein by reference in its entirety as if set forth in full and describes systems and methods for diffracted data retrieval of data that has gone through the processes of the '294 application. FIG. 2 is a reproduction of FIG. 1 of the '466 application which illustrates a system for carrying out the diffracted data retrieval described therein. As described with reference to FIG. 2, the diffracted data retrieval can involve storage device or location 140 which is local or locally connected to endpoint 110.

Figure 3:
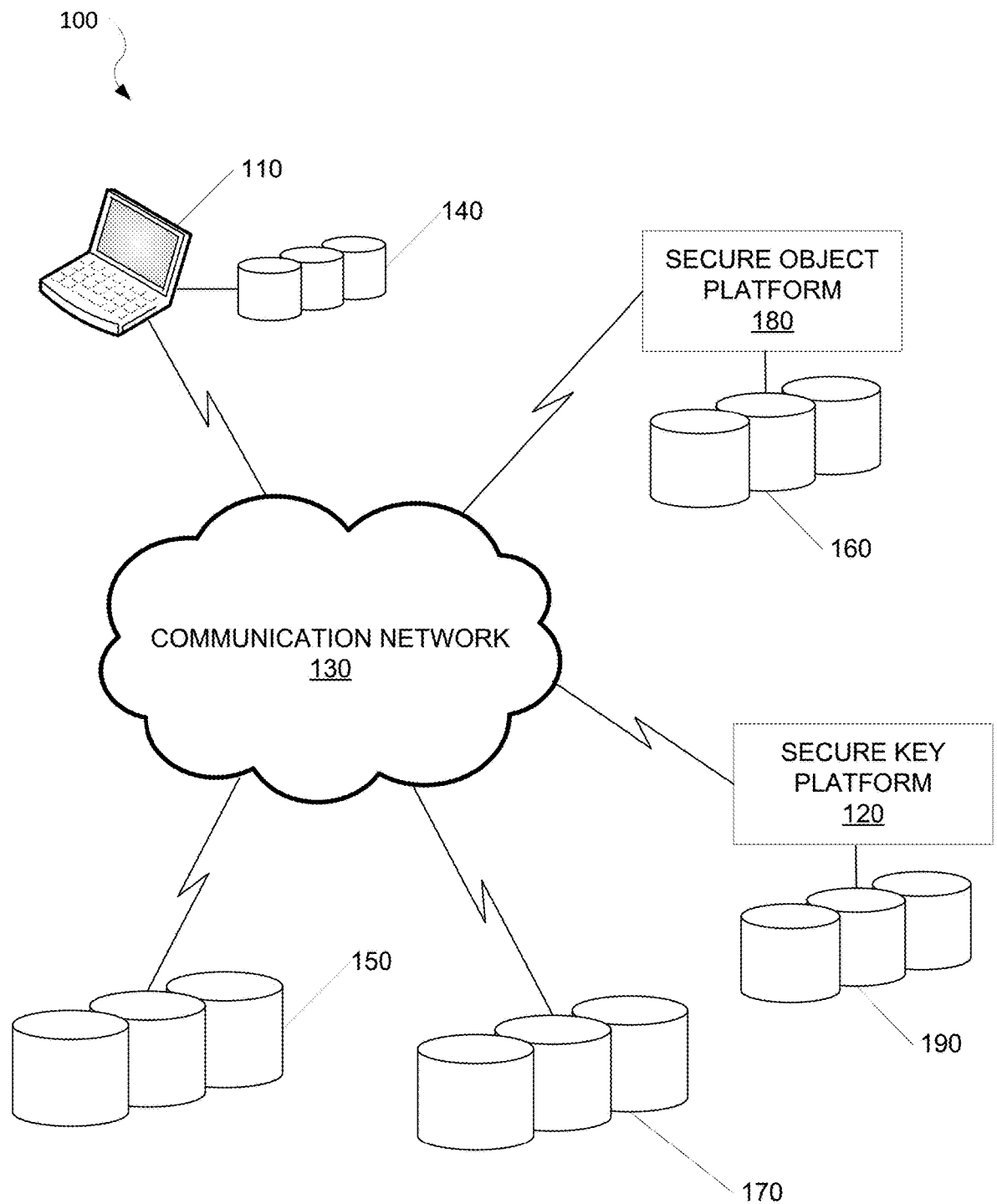
FIG. 3 is a reproduction of FIG. 1 of U.S. application Ser. No. 15/411,888, the disclosure of which application is incorporated herein in its entirety by reference.

U.S. patent application Ser. No. 15/411,888 (the '888 application), now expired, the disclosure of which is incorporated herein by reference in its entirety as if set forth in full, describes systems and methods for secure storage and management of credentials and encryption keys. FIG. 3 is a reproduction of FIG. 1 the '888 application which illustrates a system on which the processes described therein can be carried out. As described with reference to FIG. 3, the secure storage and management of credentials and encryption keys can involve storage device or location 140 which is local or locally connected to endpoint 110.

Figure 4:
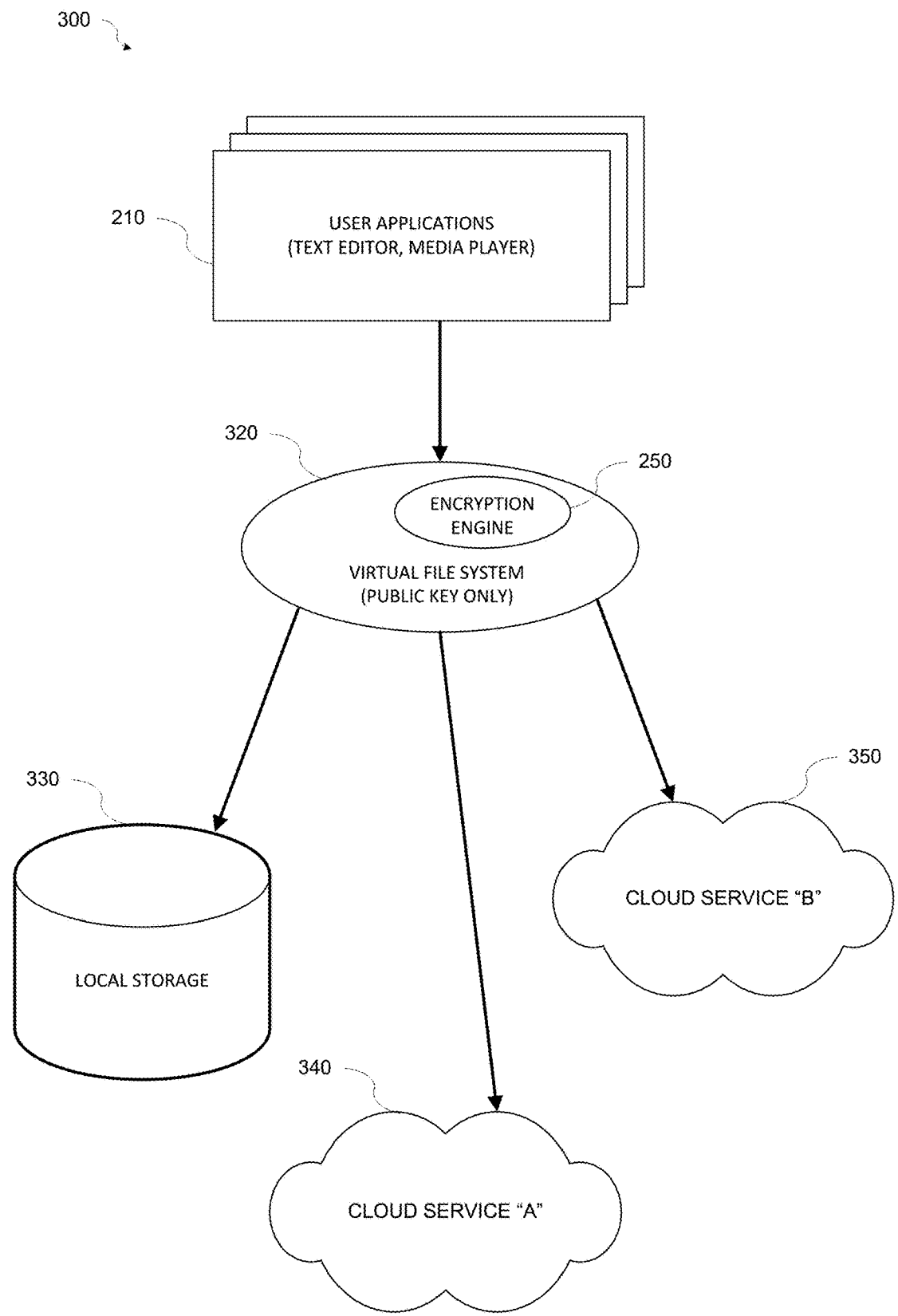
FIG. 4 is a reproduction of FIG. 3 of U.S. application Ser. No. 15/806,058, the disclosure of which application is incorporated herein in its entirety by reference

U.S. patent application Ser. No. 15/806,058 (the '058 application), the disclosure of which is incorporated herein by reference in its entirety as if set forth in full and describes systems and methods for storage of data that has gone through the processes of the '294 application. FIG. 4 is a reproduction of FIG. 3 of the '058 application which illustrates a system for storing data with a virtual file system described therein. As described with reference to FIG. 4, while the storage of data within the virtual file system involves storing data fragments at different locations within the virtual file system which can be mapped to virtual cryptological containers, the processes described therein generally do not apply to the link between endpoint 110 and servers 120 and 180. The virtual file system may also be referred to as a trusted file manager system and the virtual cryptological containers may be referred to as data repositories, and usage of either phrase throughout the present disclosure applies equally to both all embodiments herein. Virtual cryptological containers may be abstractions of the actual physical storage locations so to virtually map and associate storage locations for distributing data fragments. In this way, users of the system may think about the distributed data fragments as stored in a single virtual location or container that is in actuality mapped to plurality of storage locations.

In accordance with the systems and methods described herein, the processes described in the '294, '466, '888, and '058 applications can be implemented at the edge, e.g., on client endpoint 110 (e.g., an endpoint device, such as but not limited to, desktops, laptops, portable electronic device such as tablets, smartphones, wearable electronic devices, etc.) as illustrated in FIGS. 1-4 for example and as described in U.S. patent application Ser. No. 15/622,033 and U.S. patent application Ser. No. 16/296,123 (the '123 application), the disclosures of which are incorporated herein by reference in its entirety as if set forth in full.

Figure 5:
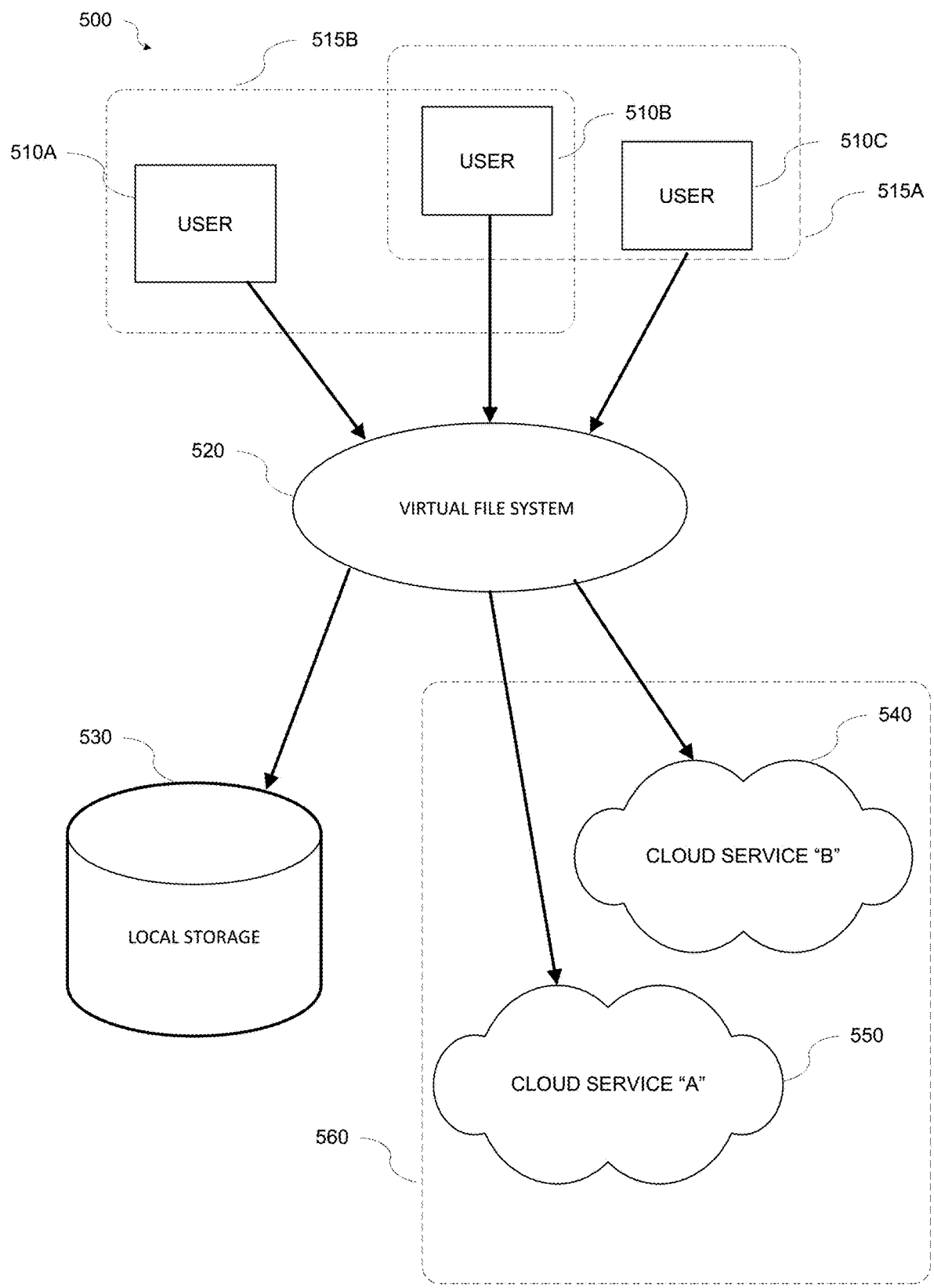
FIG. 5 is a reproduction of FIG. 16 of U.S. application Ser. No. 16/296,123, the disclosure of which application is incorporated herein in its entirety by reference.

In some embodiments, access to the system can be provided by an application interface (e.g., APIs and/or SDKs) through software running on the client endpoint 110, or through an application running on a portable electronic device such as a tablet or smartphone. Additionally, the system can be accessible over a web-based application interface, where all of the user's information is securely stored, e.g., in a secure server facility in a cloud-based network. Such implementation may be executed as a thick or thin client running on the endpoint device 110. All of which may be collectively referred to herein as a "client" and/or "local client." For example, a client can be loaded to a device 110, such that data can be saved to and retrieved from different portions of local or locally connected storage device 140 described in the '294, '466, '888, '058, '033, and '123 applications (collectively referred to herein as "the related Applications") or such that the data can be saved and stored to a plurality of storage devices 140-170. FIG. 5 is a reproduction of FIG. 16 of the '123 application which illustrates a system for comprising an application running client devices for managing and storing data with the virtual file system and data repositories as described therein. As described with reference to FIG. 5, users of the system may be arranged into groups having common authorizations to access and store data, that has been either fragmented and stored in accordance with the '294 patent, with a data repository 1660 comprised of one or more storage locations, such as location 1630, 1640, and/or 1650.

Thus, if the user of device 110 creates a document, video, picture, etc., the user can invoke to the client to store the document or file. This can involve doing all the steps described above and in the related Applications to store the fragments in a dispersed manner to different locations in storage device 140 (sometimes referred to herein as "on-premise" or local storage) or to different locations on memories 140-170 as described above and, e.g., in the '294 application. Similarly, the client can perform the diffractive retrieval of the data or file as described in '466 application and can enforce the management of credentials and encryption keys as described in '888 application. Furthermore, the client can perform storage of data within the virtual file system as described in the '058 application.

Thus, when the data is saved to a plurality of storage devices, the transmission of that data to those devices is also secured via the fact that the process separately encrypted all the fragments prior to transmission for storage. In other words, the data elements can all be fragmented and secured at the client endpoint (e.g., on-premise) before they are transmitted. A major benefit of this is that the communication channel does not need to be secured and an ordinary "open" connection can be used. For example, instead of using the slower and more expensive TLS secured browser transmission, a faster non-encrypted channel may be used. The data packets will contain secured fragments. This applies to all types of transmission, not just browser based: could be radio, FTP, Bluetooth, etc.

The client can be presented as a button in a toolbar or drop-down menu such that when the user is in a document or file on their device 110 as illustrated in FIGS. 1-4, they can simply press the button, icon, etc., in the associated client or in a web browser and the document can be stored accordingly. The document or file can then be shown on device 110 in a manner that indicates that it has been stored using the processes describe above and in the related Applications. When the user accesses the document or file again, the retrieval process described above and in t related Applications can automatically take place. In certain embodiments, the user can also select various dispersion preferences as to where all, or some of the fragments are stored.

In other embodiments, e.g., a right click on a file can be used to select the storage processes described. In still other embodiments, the client can automatically determine that a file should be stored using such processes. In still other embodiments, the default for all files, certain files, certain types of files, etc., can be set to use such processes.

Often, a user of device 110 as illustrated in FIGS. 1-4 will ultimately want to use some form of remote storage, often referred to as cloud storage to store at least some of the files created on device 110. A client(s) running on a server(s) associated with such a cloud storage service can be configured to perform the processes described in the related Applications in a manner similar to that described in, e.g., the '294 application. But as noted above, the link between device 110 and such a server would not necessarily be secure; however, as described herein, the processes described can first be run on the content locally (e.g., on-premise) prior to transferring the data to the cloud, or an intermediate endpoint. There could be many intermediate "endpoints" before ultimately making it to, for example, the cloud. The single-client to cloud is just one topology. For example, there could be a network of nodes all communicating with each other each using the systems and methods described to secure their data before transmission. Then the fragments can be stored in a dispersed manner on the cloud service. Thus, even if the data were to be intercepted in transit, it would be useless.

In certain embodiments, the client can be configured such that it automatically performs the processes described when the user attempts to store or retrieve data from a cloud storage service. Moreover, the client can be configured such that a document or file at rest, i.e., no interaction with the document or file for a certain period of time, is detected and the processes described are then automatically run to protect the document. When the user then reengages with the document or file, the appropriate processes can be run to allow access to the document or file.

In certain embodiments, the processes described can be performed locally on, e.g., a file, and then performed again as the file is being transferred to, e.g., the cloud and/or intermediate device.

In certain embodiments, sharing and collaboration of documents stored using the processes described can be enabled using the authentication and credential management processes described, e.g., in the '888 application. Thus, certain individuals can be granted access, which would then be managed using the secure keys generated, e.g., based on the credentials assigned to those individuals.

Another important benefit inures from the processes described when local storage is an unsecure storage device such as a USB drive. In such case, storing data to the device using the processes described can ensure that even if the data is accessed by the wrong individual or entity, it cannot be used. It should be noted that in certain embodiments, the local client configured to perform the processes described at the local level can reside on such a local storage device, e.g., a USB storage device.

In certain embodiments, the local client can also be configured to provide protection of email attachments. Sending attachments via email is dangerous as attached documents can be intercepted and read by any hacker with enough knowledge. The processes described herein can be implemented with respect to such attachments in such a way as to protect them from being read by anyone other than the intended recipient. Generally, the local client does not interface with email traffic or encrypt the body of the email itself. Rather, a sender of an attachment with the local client can run the processes described on the document they intended to attach (thereby sending it to a public cloud server). The client can then generate an access link to that document. The access link can then be emailed to a recipient instead of the actual document. The recipient can then click on the access link they received to download and decrypt the original document. This of course can require that the recipient also have such a local client to allow the recipient device to retrieve the attachment according to the processes described.

In other embodiments, a local client such as described above can also allow for a controlled sequenced "viewing" or "playback" of data objects, such as digital media (documents, books, audio, video, etc.) frames or sections. In such embodiments, an authorized and authenticated subscriber, or user of a device 110 as illustrated in FIGS. 1-4, is only able to retrieve and view separate sequential frames or sections that have been transmitted to them as the media is being displayed (or played). Additionally, after the subscriber proceeds to the next frame or section, the previous played frames or sections are either auto re-stored using the processes described or permanently deleted. Therefore, at any one instance, only a minimal amount of digital media is decrypted and assembled for subscriber consumption thereby minimizing piracy or unauthorized consumption. This can optionally be extended to also limit the amount of sequential frames or sections that are authorized for further transmission from the transmitting source to the authenticated and authorized subscriber through a consumption feedback mechanism back to the transmission source. The value is for more safely distributing digital media of all types, from consumer to top secret data.

Thus, prior to transmission, such digital media can be broken-down into self-contained sections or frames, and then the processes described of fragmenting/encrypting/dispersing each of those sections or frames is applied prior to transmission to an edge device 110 as illustrated in FIGS. 1-4. Upon retrieval, each section or frame can be transmitted at a time individually, in a sequential technique to recompose the underlying fragments making up that section or frame. The sequential technique need not be an order based on the viewing order, and the individual frames may be received in any order and then re-assembled upon reception and decryption.

Figure 6:
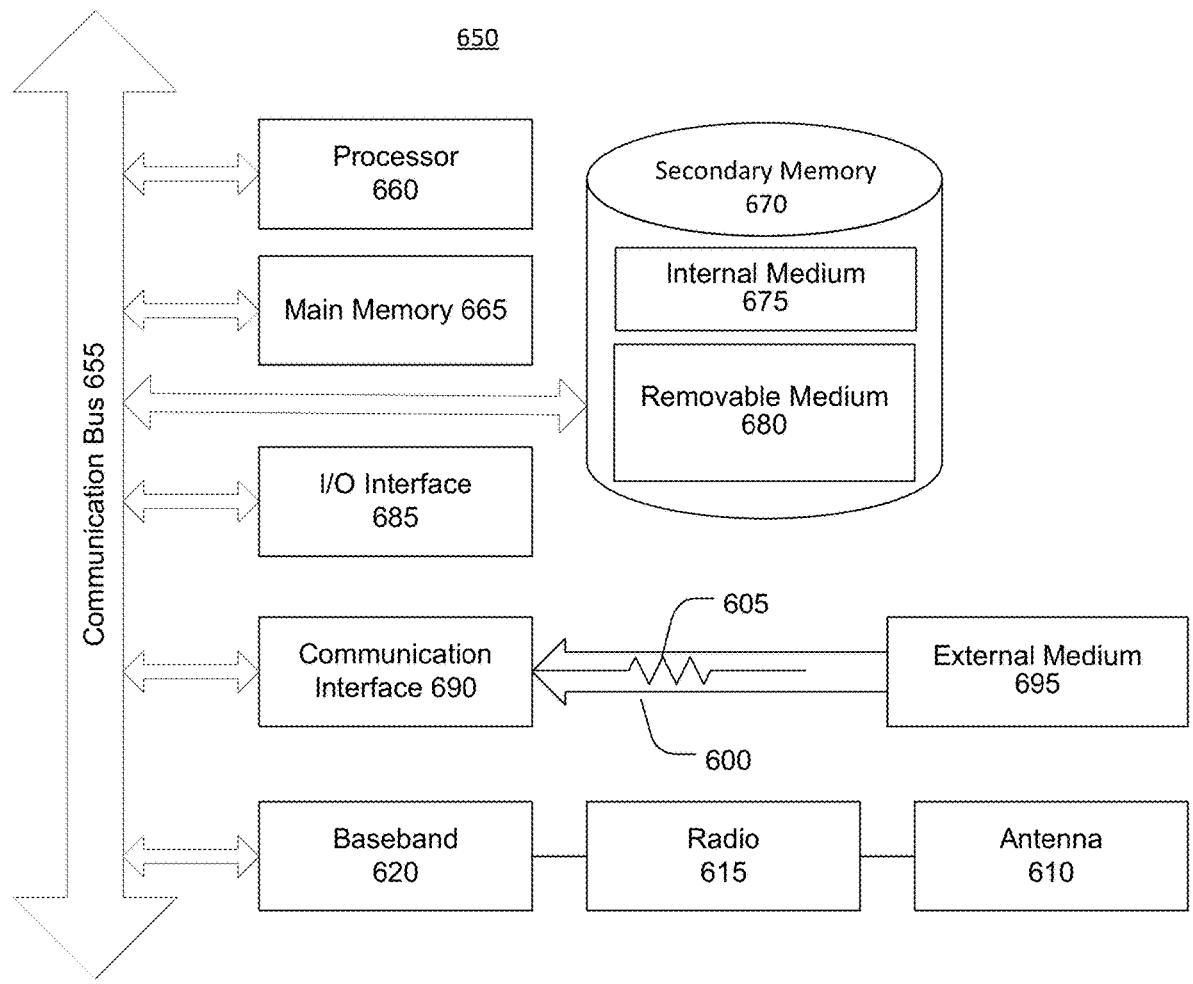
FIG. 6 is a reproduction of FIG. 4 of U.S. application Ser. No. 15/411,888.

As is noted therein, FIG. 4 of the '888 application, reproduced herein as FIG. 6, is a block diagram illustrating wired or wireless system 550 according to various embodiments that can be used to implement the client device 110 as illustrated in FIGS. 1-4. Accordingly, this system 550 will not be described here in detail.

Various embodiments described herein may provide for secure storage of a data object upon capture through disassembling, fragmenting, encrypting, and distributing of a data stream of the data object, for example, by implementing some of the steps described above in the related Applications. That is, as a data stream comprising a plurality of portions of the data object are received by a system according to the aspects of the present disclosure, each portion may be fragmented, encrypted and distributed as described, for example, in the '294 application. In some embodiments, each portion of the data stream may be securely stored by a client endpoint device at a local or locally connected storage device (e.g., storage device 140), which may be referred to herein as on-premise storage. Fragmentation, encryption, and distribution may be performed continuously as portions of the data stream are received by the device. The secured data object may then be transmitted from the client endpoint device without securing the communication pathways over which the data object is transmitted.

In various embodiments, secured fragments of the data object may be transmitted to a remote device as a data stream for storage therein or sequenced viewing and/or playback. The processes described herein may be used, for example, to stream a secured data object for live viewing from a first device to the remote endpoint, and remote device may continuously decrypt and reassemble the portions of the data stream, upon reception, for high-speed viewing at the remote device. The remote device may also store the data stream on-premise as described herein. The remote device may be a user device of a second authorized and authenticated subscriber and/or device, sometimes referred to herein as a "receiver device." In some embodiments, the first device may continuously store a data stream on-premise, as well as stream the secured data object to the remote device for live viewing. In some embodiments, the data object may be recorded on-premise, while simultaneously streaming the encrypted data object. For example, one or more of the processes described in the present disclosure may be performed in parallel with one or more of other processes and sequences described in the present disclosure.

In accordance with various aspects of the present disclosure, data sent between a first device and a second device may be fragmented into a plurality of fragments and encrypted as described herein. In some embodiments, a single data object may be broken into multiple blocks for streaming between devices, each block may then be disassembled or sliced into two or more fragments. Each fragment may be separately and individually encrypted based on encryption keys, stored in corresponding manifests, before transmission from an encrypting device. In various embodiments, the manifests may be encrypted using an encryption key, for example, a unique key known by the first and second device. In various embodiments, the unique key is only known by the pair of devices, and each pair may comprise a different unique key. The second device may then decrypt a manifest based on the unique key and retrieve keys used to encrypt the data fragments. The fragments may then be decrypted and the data object reassembled at the second device.

Once a manifest has been transmitted, a new unique key may be derived based on an encryption algorithm and/or the unique key can be regenerated based, in part, on the same or a different encryption algorithm, and the new unique key can be used to encrypt and decrypt the next manifest. Thus, in various embodiments, an encryption engine may dynamically interoperate and layer a plurality of key exchange solutions (e.g., encryption algorithms) for encrypting the manifest. Such key exchange solutions can include private/public exchange between devices, for example, but not limited to, the Diffie-Hellman protocol (DHE) used in TLS, ratchet functions, etc. After a number of manifests and corresponding derived unique keys are sent, the shared encryption key can be rebuilt using shared information between the first and second devices. The frequency that the shared key is rebuilt or regenerated may be controlled by the client and/or device and can alter in frequency based on various factors including, but not limited to, required security, network throughput, network reliability, and both internal and external threats.

The various embodiments described in the present disclosure may provide for increase the availability of computation resources. For example, due to streaming of secured blocks of fragments as described herein, the systems described herein may be able to encrypt the fragments and manifest in parallel. Thus, fragments and manifests can be prepared at an increased rate, rather than waiting for the entire data object and related manifests to be encrypted. Whereas, conventional systems utilize a single key generation algorithm to generate a shared key for the entire data object each time the data object is to be transmitted.

In various embodiments, the plurality of fragments and associated manifests can be transmitted in any order over any network or communication pathway. Accordingly, another example advantage that inures from the embodiments described herein is an ability to leverage a multi-cast environment. Such environments may be less taxing on computer resources, thereby facilitating low latency and full data encryption. For example, as described herein, prior to transmission each data fragment may be encrypted using a random key (e.g., symmetric keys) that are stored in an associated manifest(s). To create a secure multi-cast environment, in some embodiments, only manifests to be transmitted at a given time need be encrypted between a first and second device. Thus, the entire transmission need not be encrypted before transmission of the data object. Since the fragments are already encrypted and other manifests need not be encrypted until transmission, the computation resources, bandwidth, and the like needed for encryption and transmission can be reduced. Furthermore, the manifest may be relatively small compared to the entire transmission; thus, necessary computational resources for encrypting and transmitting each manifest may be significantly reduced as compared to encrypting the entire manifest between devices.

In some embodiments, the multi-cast environment may comprise transmission of the data object over one or more communication pathways. For example, data fragments, manifests, and/or encryption key information may be transmitted between devices over a plurality of communication pathways. In some embodiments, each communication pathway may be of one or more different types of physical pathways including, but not limited to, standard networking cable, Wi-Fi, WLAN, LTE, cellular networks, optical, microwave, satellite, radio, etc. Thus, data may be transmitted via one or more different physical pathways at approximately the same time, simultaneously, or at different times. In some embodiments, the communication pathways may comprise a plurality of transmissions along one or more of the same physical pathways such that one or more of data fragments, manifests, and/or encryption key information may be transmitted at different times. In some embodiments, data fragments, manifests, and/or encryption key information may be transmitted in a sequenced order based on the data object (e.g., a logical order derived from the original data structure and/or content). In other embodiments, alone or in combination, data need not be transmitted according to the order generated and encrypted at the first device and may be transmitted in any order such that different data fragments, manifests, and/or encryption keys arrive at the receiving device in a pseudo random order.

Accordingly, by fragmenting the data and pushing different fragments and manifests over the plurality of communication pathways, improved security may be achieved since fragments of the data object can follow different communication pathways and the logical order would not be obvious to an interloper. For example, in order to successfully eavesdrop on a transmission, all communications pathways utilized for transmission would need to be known and monitored for each manifest and data fragment. Additionally, manifest would need to be correctly decrypted and each fragment would need to be associated with the correct corresponding manifest. If any fragment or manifest is missed or incorrectly decrypted, the transmission could not be correctly reconstructed.

Furthermore, in certain embodiments, using a plurality of communication pathways may facilitate improved data throughput and speeds as well as load balancing. For example, by utilizing various communication pathways for a transmission of a secured data object, the data load can be spread out over the plurality of communication pathways, rather than saturating a single network.

In some embodiments, additional security benefits can be achieved by sending data decoys along with actual data fragments and manifests to mislead or misdirect adversaries or eavesdroppers.

In some embodiments, systems according to the various aspects of the present disclosure may be configured to monitor transmissions between devices. For example, transmission analytics may be leveraged and any number of actions may be performed on by users based on that data. By monitoring the transmission, the systems described herein may determine a performance characteristic for the plurality of communication pathways. In some embodiments, the systems described herein may be configured to embed tagging data into the data fragments which may provide an added degree of tracking and monitoring for the purposes of determining performance characteristics. The performance characteristic may be, for example, but not limited to, a signal strength, network performance, pathway congestion, signal interference, cost, or any other parameter indicative of a pathway performance. The performance characteristics of each communication may be compared against other communication pathways of the plurality of communication pathways to determine relative performance between the communication pathways. The systems described herein may then prioritize the plurality of communication pathways based on the determined relative order, for example, by prioritizing communication pathways in order of descending performance with the highest performing communication pathway prioritized over others. In another embodiment, the systems described herein may determine to avoid poorly performing pathways, for example, non-responsive pathways or those having a performance below a predetermined threshold.

i. End Point Device Registration

Figure 7:
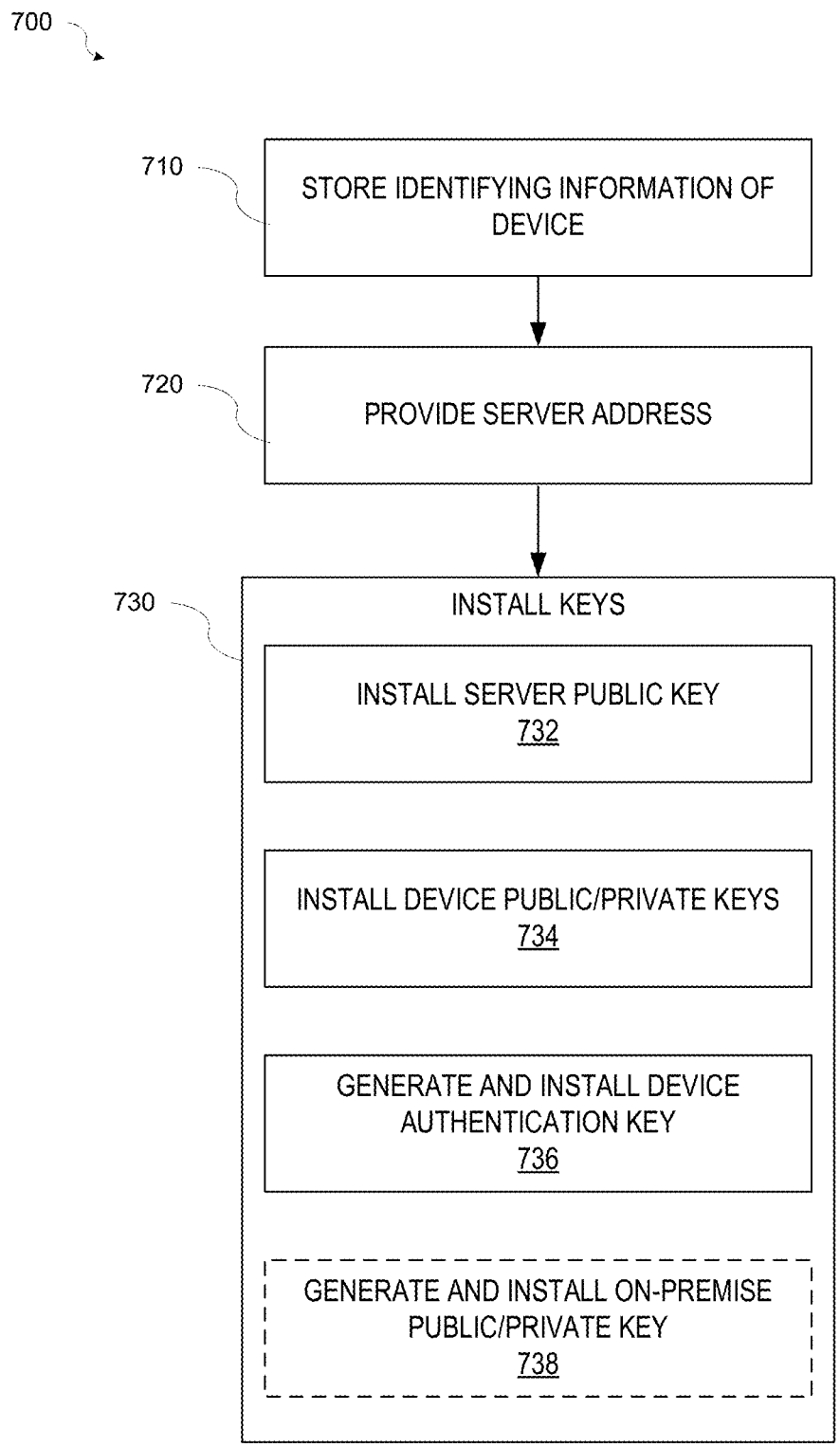
FIG. 7 is a flowchart illustrating a method for authenticating a device in accordance with various aspects of the present disclosure.

When a new device (such as an IoT device) is attempts to communicate via the servers and platforms described herein, there needs to be a way to authenticate that device. For example, when a new device is added, the device may need to be registered with the server (e.g., servers 120, 180, 901, 1301, etc. as described herein) so to be authenticated for access. FIG. 7 is a flowchart illustrating a method 700 for registering a device in accordance with various aspects of the present disclosure. In some embodiments, method 700 may be executed at block 1405 of FIG. 14 described below.

Referring to FIG. 7, at block 710, following connection of a new device to a network, identifying information of the device may be stored, for example, in a data storage device coupled to a server. The data storage device may be a storage location 170, 190, etc. as described herein. In some embodiments, the data storage device may store identifying information for a plurality of authenticated devices. In various embodiments, identifying information may comprise a unique identifier (UID) of the device and one or more descriptive characteristics of the device. The unique identifier may be any identifying information indicative of the device, for example, a serial number, model number, cellphone ESIN, etc. In some embodiments, the descriptive characteristics of the device may be indicative of one or more of a description of the device, capabilities of the device, and/or permissions afforded to the device. For example, a description may be a PI Camera located on NW Corner of Main and Oak Street, having capabilities including abilities to pan, tilt, on-premise capture, video and/or audio capture, color transmission, permit remote control, number of days for captured data to be stored, and permissions for operation, for example, by police and/or fire personnel.

In some embodiments, block 710 may comprise ascertaining the identifying information of the device. For example, the identifying information may be accessed by the server via a program or script configured to recognize such information (e.g., a mother board or CPU serial number) within the device (e.g., stored or otherwise recorded therein) and retrieve the information for storage in block 710. In another embodiment, a scanner or camera may detect identifying information on the device and communicate this information to the server. In some embodiments, the device may generate a file comprising the identifying information that may be communicated to the server when a connection is established. In some embodiments, identifying information may be entered manually.

At block 720, the device may be configured for communication via the network, for example, by providing an address of the server (e.g., an IP address or the like). The address of the server may be communicated from the server to the device, for example, through wired and/or wireless communication. In some embodiments, the address of the server may be included in a configuration file communicated to the device during installation.

At block 730, one or more encryption keys may be installed onto the device, for example, via instructions and authentication by the server. The one or more encryption keys may be configured to facilitate the encryption processes as described throughout the present disclosure and related applications. In some embodiments, one or more of the encryption keys may be included in the configuration file described above. In another embodiment, alone or in combination, one or more of the encryption keys may be transmitted and installed independently from the configuration files.

The encryption keys may comprise one or more of symmetric keys, asymmetric key pairs (e.g., private/public key pair), and/or one of a pair of asymmetric keys (e.g., a public or private key). In some embodiments, a public key of the server (referred to herein as FPub) may be installed onto the device, for example, at block 732. The FPub key may be required for authentication of the device with the server and/or authentication of communications received from other remote devices connected to the server. In some embodiments, a unique authentication key pair (referred to herein as APriv for the private key and APub for the public key) may be installed on the device, for example at block 734. The APriv/APub pair may be used by the device to authenticate data produced and/or transmitted by the device, for example, by signing such data with its corresponding APriv. Thus, when the data is transmitted to another device it may be verified via the corresponding APub.

At block 736 the APub may be signed by the private key of the server (referred to herein as FPriv) to generate a server authentication key (referred to herein as ASPub), which may be indicative that the device has been authenticated via the server (e.g., is a trusted device). The device may not be considered trusted until the ASPub is installed. In various embodiments, however, the ASPub may be created during the process 700; thus, the device may not be considered trusted during this process. As such, approval of the device and/or the user of the device may be required before the server will be able to generate and/or distribute the ASPub. In some embodiments, approval may be completely automated, for example, in a manner similar to activating a new cellular phone. That is, through a prescribed procedure by logging into a web portal or otherwise accessing an automated approval program. In some embodiments, approval may also be manual, for example, where an administrator hand carries the device information and enters it into the server. Generally, approval may interoperate within existing frameworks.

In some embodiments, the types of encryption keys installed on the device at block 730 may be based, in part, on the desired configuration of the device. For example, if the device is capable of local, on-premise recording, then at block 738 an on-premise public/private key pair (referred to herein as OPPub and OPPriv, respectively) may be generated by the server. The OPPub key may be installed on the device, while the corresponding OPPriv may be stored with the server. In some embodiments, OPPub may be used by remote devices to decrypt local, on-premise recording of the device. For example, the server may receive data encrypted using OPPub from an authenticated device, decrypt this data using the corresponding OPPriv, and transmit the decrypted data back to the authenticated device.

In certain embodiments, the various encryption keys may be stored in one or more locations and/or data storage device. For example, the FPriv and FPub keys may be stored in a location corresponding to or connected to the sever, while the FPub key may also be stored at a storage location corresponding or connected to the device. The APriv/APub keys, and ASPub key may be stored at a location corresponding to or connected to the device. The OPPriv key may be stored at a location corresponding to or connected to the server, while the OPPub is stored with the device.

ii. Key Exchange Methodologies

Various aspects of the present disclosure provide methods for integrating any number of key exchange methodologies, including the built-in key exchange process of the device, to facilitate this operation. This capability enables authenticated communications between two devices, for example, in the case of data streaming between those devices. Once communication is established between the two devices, the key exchange methodology and frequency of exchange may be dynamically varied based on performance requirements and in response to any number of conditions, for example, but not limited to, data security threat levels. An encryption engine may dynamically interoperate and layer with other key exchange solutions including private/public exchange, for example, but not limited to the Diffie-Hellman protocol used in TLS, between devices. Higher levels of security may be achieved by utilizing the most secure keys and maximizing the rate of key rotation for a given set of data.

Figure 8:
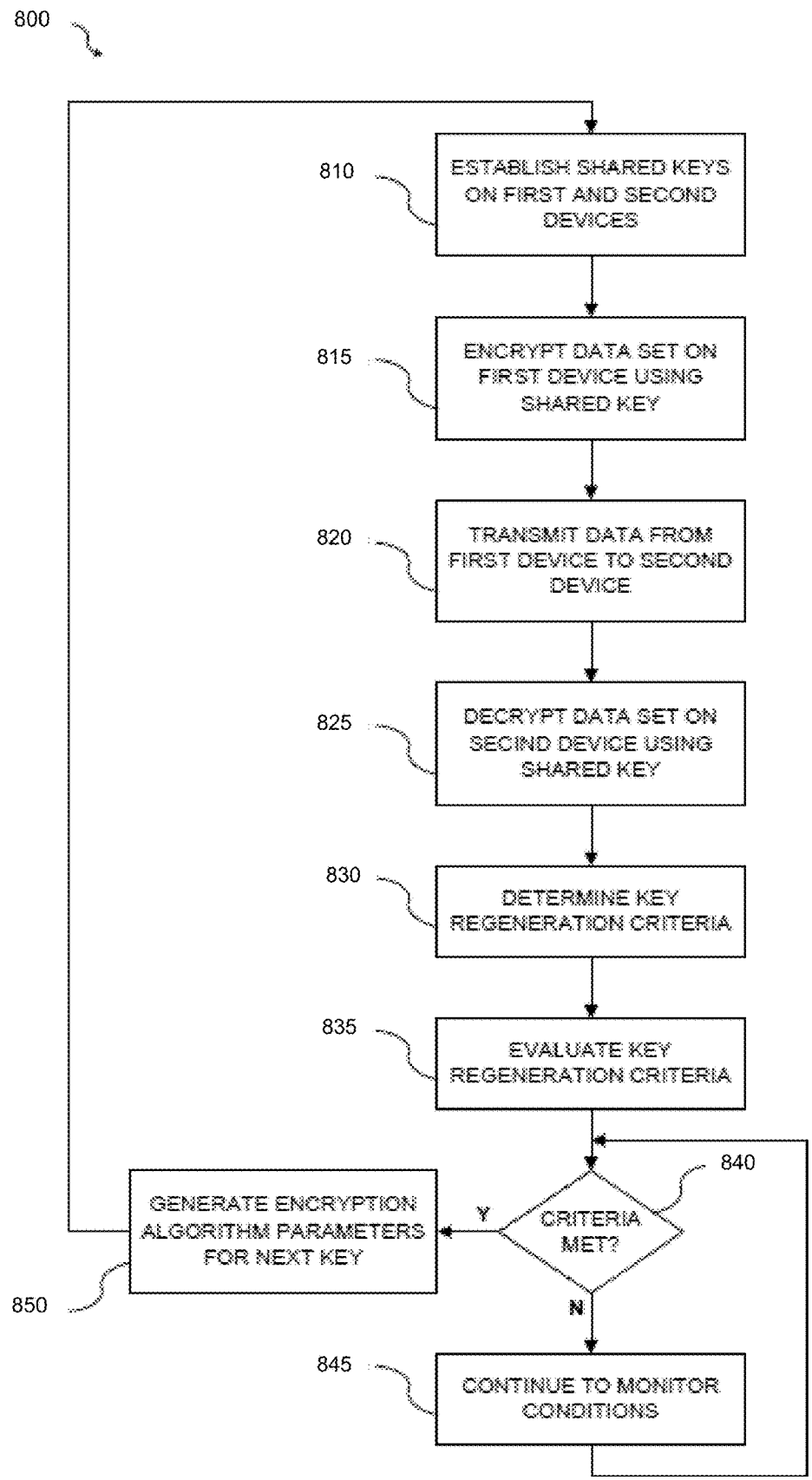
FIGS. 8-10B are reproductions of FIGS. 18-20B, respectively, of U.S. application Ser. No. 15/622,033 ("the '033 application"), the disclosure of which application is incorporated herein in its entirety by reference.

FIG. 8 is a reproduction of FIG. 18 of the '033 application that illustrates an example flowchart of a method 800 for exchanging keys in accordance with various aspects of the present disclosure. Referring to FIG. 8, at block 810, based on the current encryption algorithm parameters and seed, each device, for example, a first device and a second device, may establish a shared key. One of ordinary skill in the art will appreciate that more than two devices may be utilized without departing from the scope of the present disclosure.

At block 815 a dataset on the first device may be encrypted using the shared key and at block 820 the first device may transmit the encrypted data to the second device. At block 825 the second device may decrypt the dataset using the shared key. At block 830 key regeneration criteria that indicate whether the keys should be regenerated may be determined. At block 835, the key regeneration criteria may be evaluated for each data set. At block 840, it may be determined whether the key regeneration criteria are met. In response to determining that the key regeneration criteria are not met (840—N), at block 845 conditions that indicate when keys should be regenerated may be monitored until the key regeneration criteria are met at block 840. In response to determining that the key regeneration criteria are met (840—Y), at block 850 new encryption algorithm parameters for the next key may be generated and the method may continue at block 810. The key regeneration criteria may identify possible encryption algorithms and specific parameters for the encryption algorithms.

iii. Encrypted Data Transmission

In accordance with various aspects of the present disclosure, encrypted data may be transmitted with unique encryptions through multiple simultaneous client destinations including, but not limited to, streams, filesystems, and/or clouds. Encrypted data may be directed to any number of destinations such as a stream format decrypted to a video player, or as a set of fragments stored securely on a filesystem or cloud. The item to be encrypted can be in any number of data formats including, but not limited to, files (e.g., Word documents, photo files, virtual machine files, etc.), key-value pairs (e.g., simple strings such as JSON or other formats suitable to store form data, client settings and preferences), and streams (e.g., video or data feeds).

In accordance with various aspects of the present disclosure, each object may be disassembled into smaller fragments enabling a reduction in the total transmission time, T, for each object, in some cases enabling transmission times up to 8-15 times faster than conventionally available. Fragments of an object may be encrypted only once while increasing security by utilizing unique keys for each client. This approach may provide a performance advantage even while sending encrypted data to multiple client destinations. Each destination may have a unique decryption key to access the data. Multiple secure output streams to multiple destinations may be created while minimizing hardware resource demands. Fragmenting, encrypting, and transmitting data between computing devices can achieve low latency and full data encryption. In accordance with various aspects of the present disclosure, the approach may be scaled to support multiple clients maintaining a unique shared secret key between each client and encrypting the manifest differently for each intended client.

Figure 9:
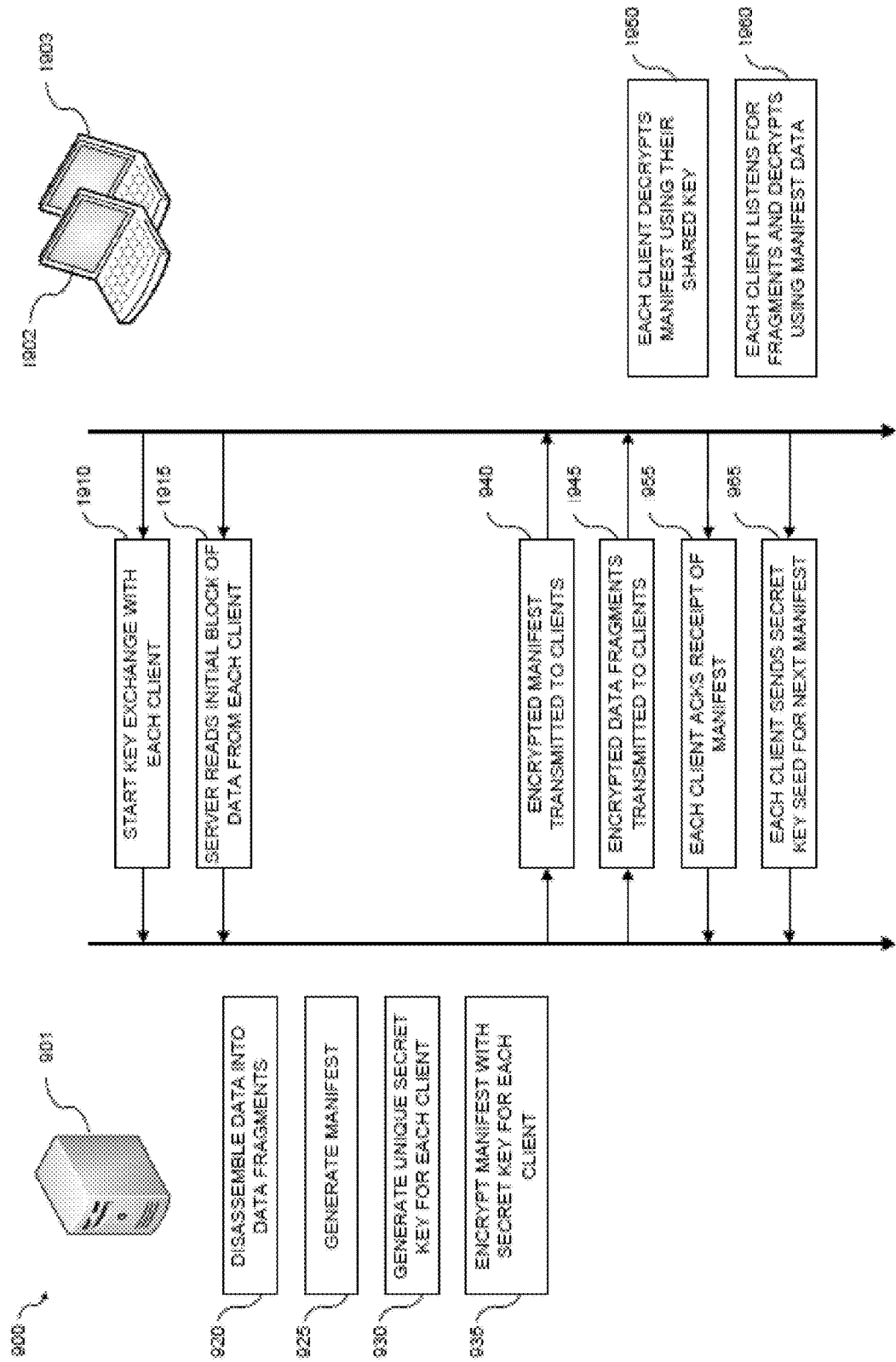

FIG. 9 is a reproduction of FIG. 19 of the '033 application that illustrates an example sequence diagram of an encrypted data transmission sequence 900 in accordance with various aspects of the present disclosure. Referring to FIG. 9, at block 910 client software running on each client 902, 903 communicates with the server 901 and starts a key exchange process. At block 915, the server 901 reads a block of data, for example, one frame of a video stream, a sample of audio, etc., from a source which could be a file or data sensors including, but not limited to, cameras, video, and/or audio sensors. At block 920, the server 901 disassembles the data creating data fragments. At block 925, the server generates a manifest for each of the clients 902, 903 which contains, among other data, unique encryption keys for each of the data fragments. At block 930, the server 901 uses the key exchange information from each client 902, 903, to create a unique shared key for each client 902, 903. At block 935, the server 901 encrypts the manifests using the unique shared key for each client 902, 903.

At block 940, the server 901 transmits the encrypted manifests to each of the clients 902, 903. One of ordinary skill in the art will appreciate that different data may be transmitted to each client 902, 903 and therefore a different manifest may be generated and transmitted by the server 901 to each of the clients 902, 903. The server 901 encrypts the data fragments and at block 945 transmits the encrypted data fragments to the intended clients 902, 903. At block 950, the client software running on the clients 902, 903 awaits receipt of the manifest and decrypts the manifest using the unique shared key. At block 955, each client 902, 903 acknowledges receipt of the manifest to the server 901. At block 960 each client 902, 903 listens for encrypted data fragments and decrypts each data fragment using data contained within the manifest. At block 965, each client 902, 903 sends a shared key seed for the next manifest to the server 901.

The sequence of FIG. 9 may be repeated for each block of data read from a client. The data fragments may be received by the clients in any order and will be reassembled and processed in the correct order. The server may repeat the sequence for the next block of data all beginning at block 920. For each block of data, the client will await the receipt of the corresponding manifest. If the server does not receive a manifest acknowledgment from the client, the server will withhold the next block of data until an acknowledgment is received or until a timeout interval has expired. If a client receives an incomplete or inaccurate manifest the server may be notified to resend the current manifest encrypted with a new shared key. If a client receives incomplete or inaccurate data fragments, the server may be notified to resend the current block of data.

iv. Data Encryption Speed

In accordance with various aspects of the present disclosure, a preprocessor may pre-slice or break up a large file into smaller pieces prior to the fragmentation and encryption processes. A companion post processor may recombine the file subsequent to decryption and defragmentation. By disassembling data objects into smaller fragments and encrypting those individual fragments across multiple processor threads a speed advantage (e.g. 5×-15×) may be gained without reducing the key size or otherwise compromising the security level. "Slicing," i.e., breaking up a large file into smaller pieces prior to fragmentation and encryption and then recombining them after defragmentation and decryption, can increase performance and permit processing of very large data objects on devices that have limited memory. This technique may also make it possible to encrypt data using extremely resource-limited devices such as tiny single board computers or IoT devices with limited CPUs and memory. The slicing algorithm may be responsive to resource conditions at any given moment in time and adjust dynamically to optimally break up files.

Figure 10A:
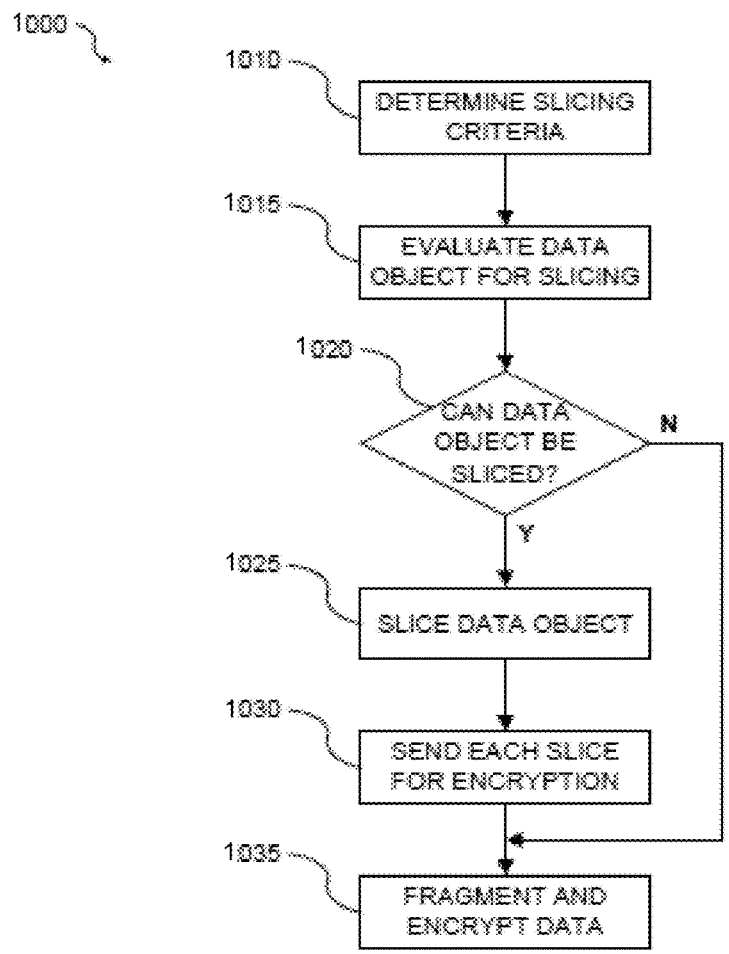

FIG. 10A is a reproduction of FIG. 20A of the '033 application that illustrates an example flowchart of a method 1000 for pre-slicing data to increase encryption speed in accordance with various aspects of the present disclosure. Referring to FIG. 10A, at block 1010 data slicing criteria may be determined. At block 1015, a data object may be evaluated for slicing based on the determined slicing criteria. At block 1020, it may be determined whether the data object can be sliced. In response to determining that the data object can be sliced (1020—Y), at block 1025, the server may break up or "slice" the data object into smaller pieces of data, and at block 1030 each data slice may be sent for encryption. At block 1035, the server may disassemble each data slice into data fragments and the data fragments may be encrypted. The data may be disassociated and dispersed for storage in one or more storage locations.

Figure 10B:
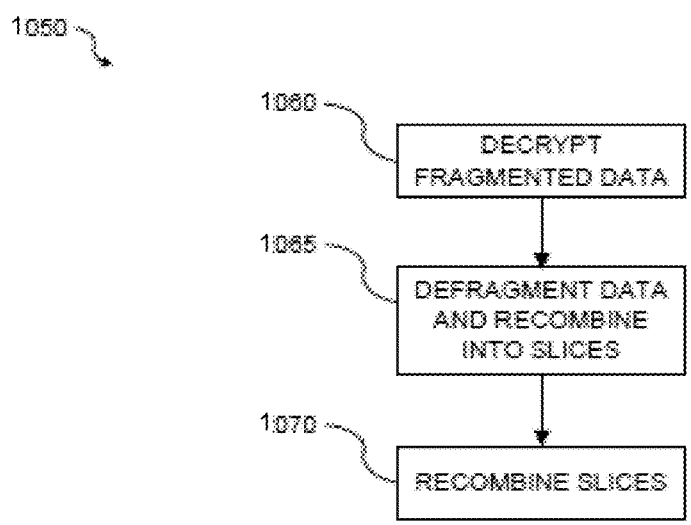

FIG. 10B is a reproduction of FIG. 20B of the '033 application that illustrates an example flowchart of a method 1050 for recombining a data file in accordance with various aspects of the present disclosure. Referring to FIG. 10B, at block 1060, encrypted data fragments may be decrypted. At block 1065 the decrypted data fragments may be defragmented and recombined into data slices. At block 1070, the slices may be recombined into the data object.

v. On-Premise Encrypted Data Storage

In some embodiments, the client running on the endpoint device may be configured to encrypt a data stream of a data object while the data is captured. That is, as a data object is generated and/or captured by the endpoint device, a data stream of portions of the data object may be provided to the client (e.g., by the client endpoint device or an internet-of-things (IoT) device coupled thereto). The client may continuously fragment and encrypt each individual portion of the data stream in accordance with aspects of the present disclosure. After each portion of the data stream is fragmented and encrypted, the client may distribute the encrypted data fragments of the data stream to different local or locally connected storage devices 140 (e.g., referred to herein as on-premise storage) or to transmit the secured data to different locations on memories 140-170 as described above, thereby securing the data object approximately simultaneously (e.g., in near real-time) with reception of the data.

Figure 11:
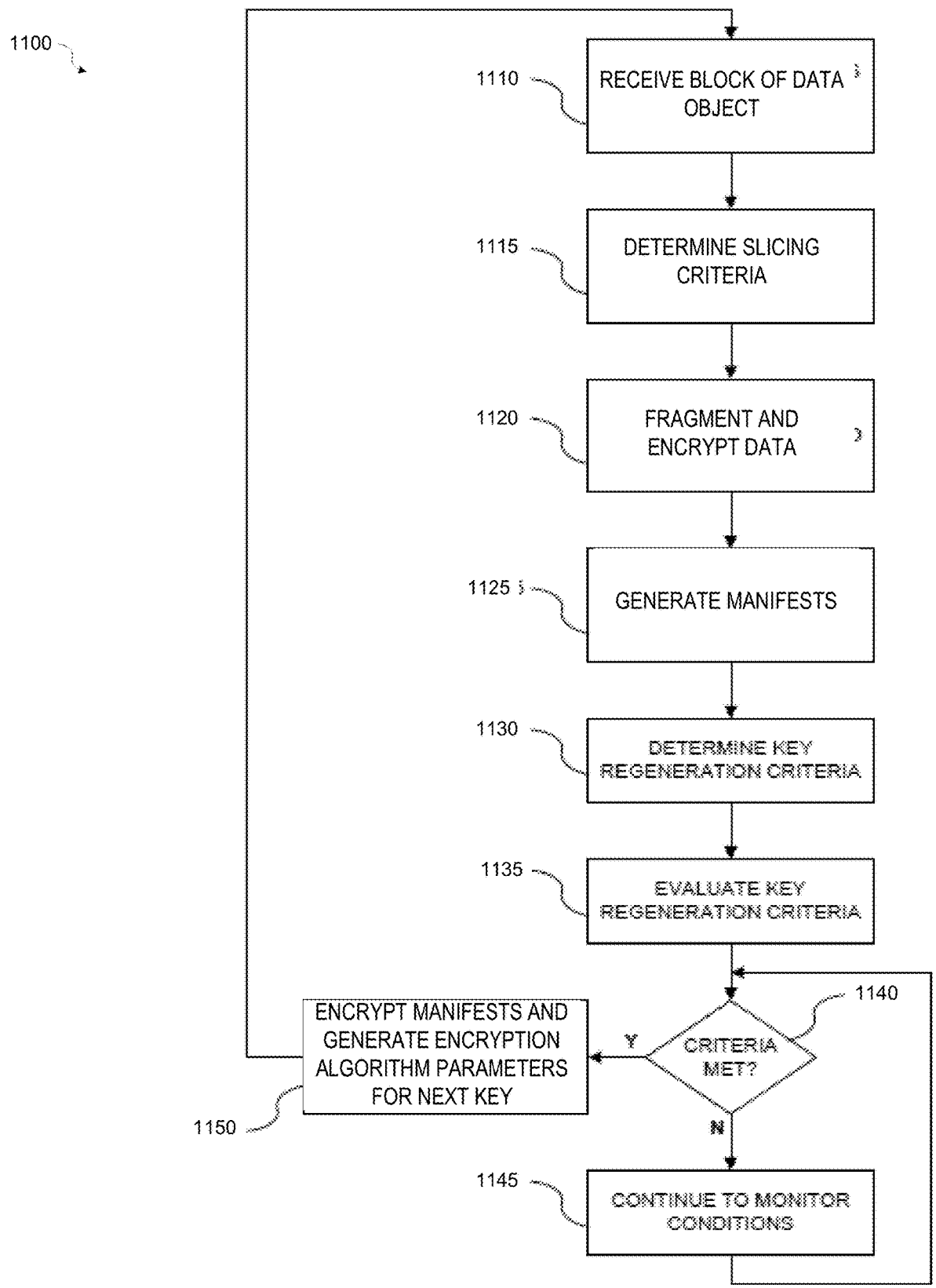
FIG. 11 is a flowchart illustrating a method for storing a data object in accordance with various aspects of the present disclosure.

FIG. 11 is a flowchart illustrating a method 1100 for secure storage of a data object in a locally connected storage device in accordance with the present disclosure. At block 1110, a data object is received, for example, at a client endpoint device. In some embodiments, the data object is received via a data stream from a remote device configured to capture, generate, or otherwise produce a data object (e.g., an IoT device or the like). The remote device may transmit a data stream comprising a plurality of portions of the data object as they are generated at the remote device. In an illustrative example, with reference to the system 100 of FIG. 1, an input device 104 may be a remote device that may capture and/or otherwise generate a data object that can be provided to the computer/server platform 101 (e.g., a client endpoint device). For example, input device 104 may be a camera configured to capture a data object as a video file comprising a plurality of image frames, which are sequentially transmitted from the remote device to the client endpoint device. The data object may be any digital media (e.g., video, image, audio, etc.) or document, and a video is used herein for illustrative purposes. The plurality of image frames may be captured in sequence and streamed to the computer/server platform 101 for storage in a local storage device and/or in an external removable storage device in accordance with the aspects described herein. In some embodiments, the data object also be captured and/or generated by the client endpoint device, for example, as the user of a device creates a document or digital file.

At block 1115, slicing criteria is determined as described above in connection with FIG. 10A. For example, the data stream may be sliced into blocks of data and, at block 1120, the data stream may be fragmented and encrypted in accordance with the various aspects of the present disclosure. For example, the computer/server platform 101 may be configured to disassemble, fragment and encrypt the video stream of image frames as they are received from the input device. The computer/server platform 101 may slice the received video stream according to slicing criteria, such as, five-minute blocks of video data and disassemble each block into one second data fragments. While an example slicing criteria is described herein, other slicing criteria may be implemented within the scope of the present disclosure. For example, larger and/or smaller slices of the data object and data fragments may be implemented based on network resources and bandwidth as well as desired data transfer speeds. As an example scenario, very large objects may benefit from the slicing technique. For example, attempting to encrypt a 1 Terabyte file on a device using conventional encryption technology can take many hours of processing. Using slicing in accordance with the present disclosure, it becomes possible to break the file up into a hundred 10 GB slices each typically taking about a minute to process.

Figure 12:
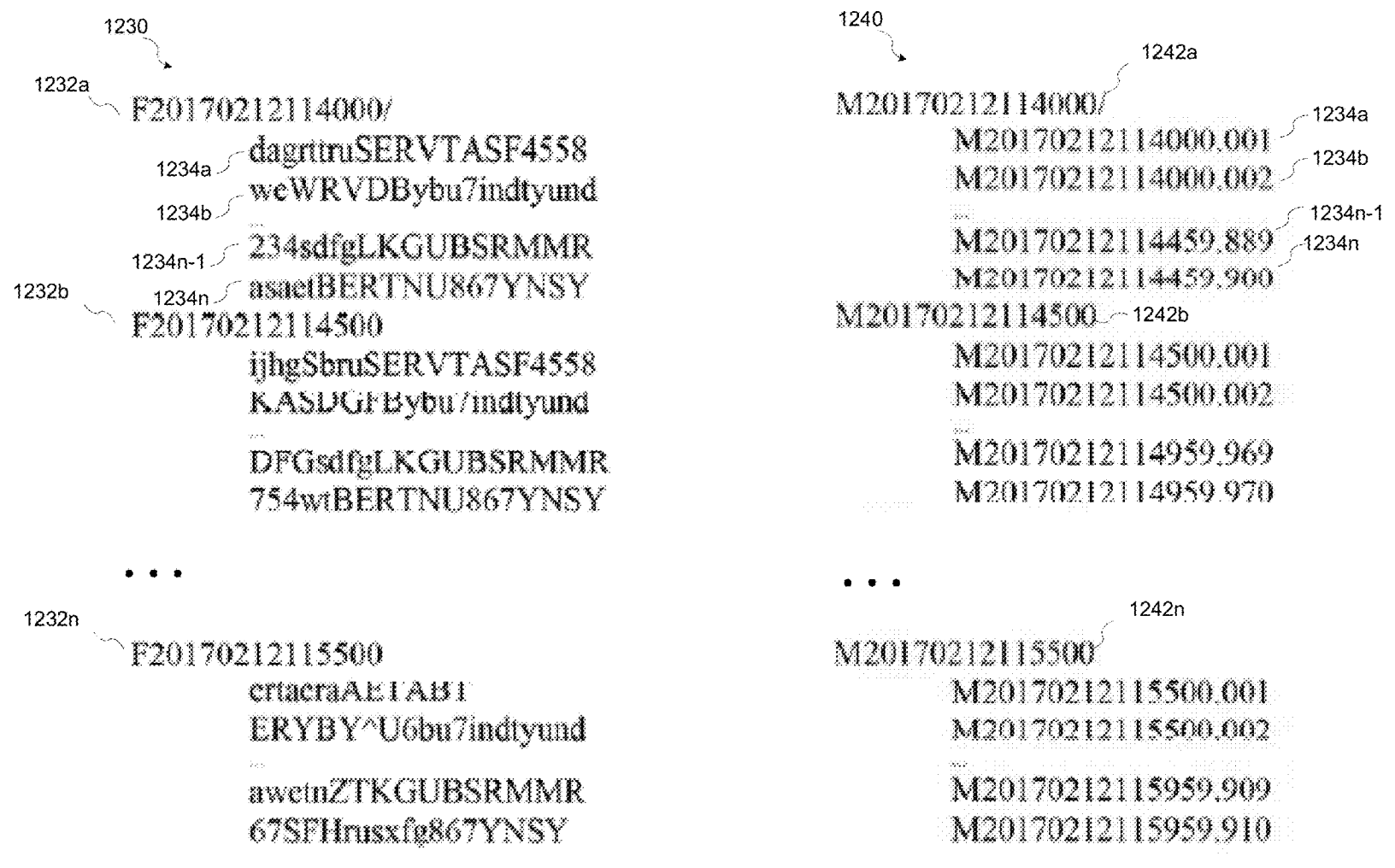

In some embodiments, at block 1120, the encrypted data fragments may be stored according to a data structure. For example, FIG. 12 illustrates example directory data structures that may be created in accordance with various aspects of the present disclosure, for example, based on the process 1100. The data structures of FIG. 12 may be implemented to store a data object at a locally connected storage device, for example, by organizing and managing the data fragments, and manifest in accordance with the structures of FIG. 12.

In some embodiments, the blocks and data fragments of the data object may be stored, for example, according to a directory data structure 1230 of FIG. 12. In the illustrated example, structure 1230 depicts an example data object organized into smaller blocks of data. For example, the data object may be received as a data stream and stored according to directories 1232 directories 1232a-n indicative of each data block. Each block may be sliced as described above to disassemble each block into data fragments, which are then encrypted (block 1120) and arranged in subdirectories 1234a-n. In some embodiments, each directory 1232a-n may representative of a given portion of the received data stream. In other embodiments, alone or in combination, blocks may be based on criteria distinct from properties of the received portion of the data stream. Referring to the above example video stream, a stream of the data object may be received and sliced upon receipt at the client endpoint, for example, into five minutes of video per each data block and each block may be fragmented into one second of video per each fragment. In some embodiments, due to data constraints and other slicing criteria, the number of fragments per each block may not be consistent.

The data fragments are illustratively encrypted in accordance with the aspects described in the present disclosure. In various embodiments, data fragments stored via process 1100 (or in accordance with any aspect of the present disclosure) may be encrypted via asymmetric encryption to maintain the security of the data object in the event that the device is compromised. For example, the data fragments may be encrypted using a random symmetric key. In some embodiments, for on-premise storage, data fragments may also be encrypted using OPPub installed during registration and/or configuration, for example, as described above in connection to FIG. 7. Thus, to decrypt on-premise data fragments, the viewing device may be required to authenticate itself and retrieve decrypted data from the server via the OPPriv stored at the sever. Alternatively, the data fragments may be encrypted using another encryption key and/or methodology, for example, by obfuscating the data fragments in accordance with the embodiments described in the present disclosure and in the related Applications.

Returning to process 1100, at block 1125, manifests may be generated for the data fragments. In some embodiments, manifests may be generated based, in part, on the slicing criteria. For example, computer/server platform 101 may generate a data structure 1240 for storing manifests used for encrypting and/or decrypting corresponding data fragments stored according to structure 1230. The manifest may be stored as a dataset comprising the keys for decrypting the corresponding data fragments. Structure 1240 illustratively depicts an example manifest structure (e.g., sometimes referred to herein as a "dataset" structure) comprising directories 1242*a-n* corresponding to each data block directory 1232*a-n* and a plurality of manifests 1244*a-n* corresponding to each data fragment 1234*a-n*.

The data structure 1240 may be generated in accordance with various aspects of the present disclosure and may be used for encrypting and/or decrypting corresponding data fragments. For example, directories 1242*a-n* may be generated when based on a timestamp of recording of a corresponding data block. For example, directory 1242*a* may be generated when the timestamp of the corresponding data block is zero (e.g., M20170212114000 as shown for directory 1242*a*). Thus, the manifests (M) may be arranged by date (20170212) and time (114000). If the timestamp is not zero, then subdirectory 1244*a-n* may be generated with additional sequence numbering (e.g., M20170212114000.001) for storing the corresponding manifest data (sometimes referred to herein as a "dataset"). A non-limiting advantage of the structure 1240 is that by using the timestamp of the recording, it may be easy to identify files that are related to a specific date and time. Thus, it may be possible to identify and remove old files without decrypting them, as the private key need not be, or never is, loaded onto the device.

In some embodiments, each manifest may be encrypted with a symmetric manifest key (sometimes referred to herein as MK). Each symmetric key may be encrypted with an asymmetric key. For example, each MK may be encrypted with OPPub to generate an encrypted manifest key (sometimes referred to herein as eMK). Thus, to decipher a given manifest, the eMK needs to be decrypted with a private key of the asymmetric key pair (e.g., OPPriv) to determine MK.

In various embodiments, each MK may not be random, but may be derived through a regeneration function. Thus, at block 1130, key regeneration criteria are determined. The regeneration criteria may indicate whether the keys should be regenerated. At block 1135, the key regeneration criteria may be evaluated for each manifest, for example, of a given data block. That is, each directory 1242*a-n* may correspond to a data block, and keys for decrypting each manifest of a given data block may be regenerated based on the regeneration criteria. At block 1140, it may be determined whether the key regeneration criteria are met. In response to determining that the key regeneration criteria are not met (1140—N), at block 1145 conditions that indicate when keys should be regenerated may be monitored until the key regeneration criteria are met at block 1140. In response to determining that the key regeneration criteria are met (1145—Y), at block 1150 new encryption algorithm parameters for the next key may be generated for the next data block and the method may continue at block 1110. The key regeneration criteria may also identify encryption algorithms and parameters for the encryption algorithms for use in generating the next key.

For example, an encryption algorithm may be used to evaluate whether regeneration of MK is required. Once the encryption algorithm has run its course, a next MK may be derived based on the same or a different encryption algorithm. In various implementations, the regeneration criteria may be based on a ratcheting function that uses a pseudo random function and the number of steps to execute and regenerate a next key (e.g., block 1135). After the number of steps through the ratchet have been made, a new random manifest key can be generated (e.g., block 1150) and used to seed the ratchet process. In some embodiments, a security model may set the number of steps before the ratchet is re-seeded with a new random key. The security model may be included in a configuration file may be used to set seed parameters, such as a minimum frequency that the key is re-seeded. For example, a value of 0 would mean that the ratchet is never used and that a random key is used for each manifest. In some embodiments, the security model may be based on the slicing criteria.

An example ratchet process is set forth below:

$$MK_0 = RandomKey()$$
$$MK_1 = \text{Ratchet}(MK_0, 1)$$
$$MK_2 = \text{Ratchet}(MK_1, 1) = \text{Ratchet}(MK_0, 2)$$
$$MK_3 = \text{Ratchet}(MK_2, 1) = \text{Ratchet}(MK_1, 2) = \text{Rachet}(MK_0, 3)$$
$$\ldots$$
$$MK_x = \text{Ratchet}(MK_y, z) \text{ such that } x = y + z.$$

vi. Data Aggregation

In some embodiments, a client endpoint device configured to secure a data object in accordance with the present disclosure may communicate with one or more other devices that are not so configured. For example, a client endpoint device may be coupled a remote device, such as a camera, a microphone, a pacemaker, road sensor, IoT devices, etc., configured to capture and/or generate data. The remote device may then transmit to data to, for example, the client endpoint device for processing and/or storage, but the remote device may not be configured to perform the methods described in the present disclosure.

In these scenarios, the client endpoint device may be configured to aggregate data from the coupled device, for example, in either a read-only or read/write mode. As an aggregator of the data, client endpoint device may receive data directly from the remote device (e.g., a sensor where the device is a camera) and immediately disassemble, fragment, and encrypt the data in accordance with the various aspects of the present disclosure. In various embodiments, the data is transmitted from the remote device to the client endpoint device as a data stream.

In some embodiments, the remote device may also receive control packets from the client endpoint device. Such control packets may allow the client endpoint device to direct and control the behavior of the remote. For example, where the remote device is a camera, the control packets may include instructions for changing focus, resolution, frame rates, data rates, image rotation, etc.

vii. Remote Access to Encrypted Data

In some embodiments, a remote device may request a data object stored at a client endpoint device in accordance with the various aspects of the present disclosure. For example, a client endpoint device may have encrypted and stored a data object in accordance with process 1100 above, and a second device may request this data object. In some embodiments, the second device may be a remote second client endpoint device similar to device 110. In some embodiments, client endpoint device may be an intermediate endpoint between a data capturing device and the requesting device. In various embodiments, the requesting device may be responsible for decrypting manifests and fragments and re-assembling the data object.

Figure 13:
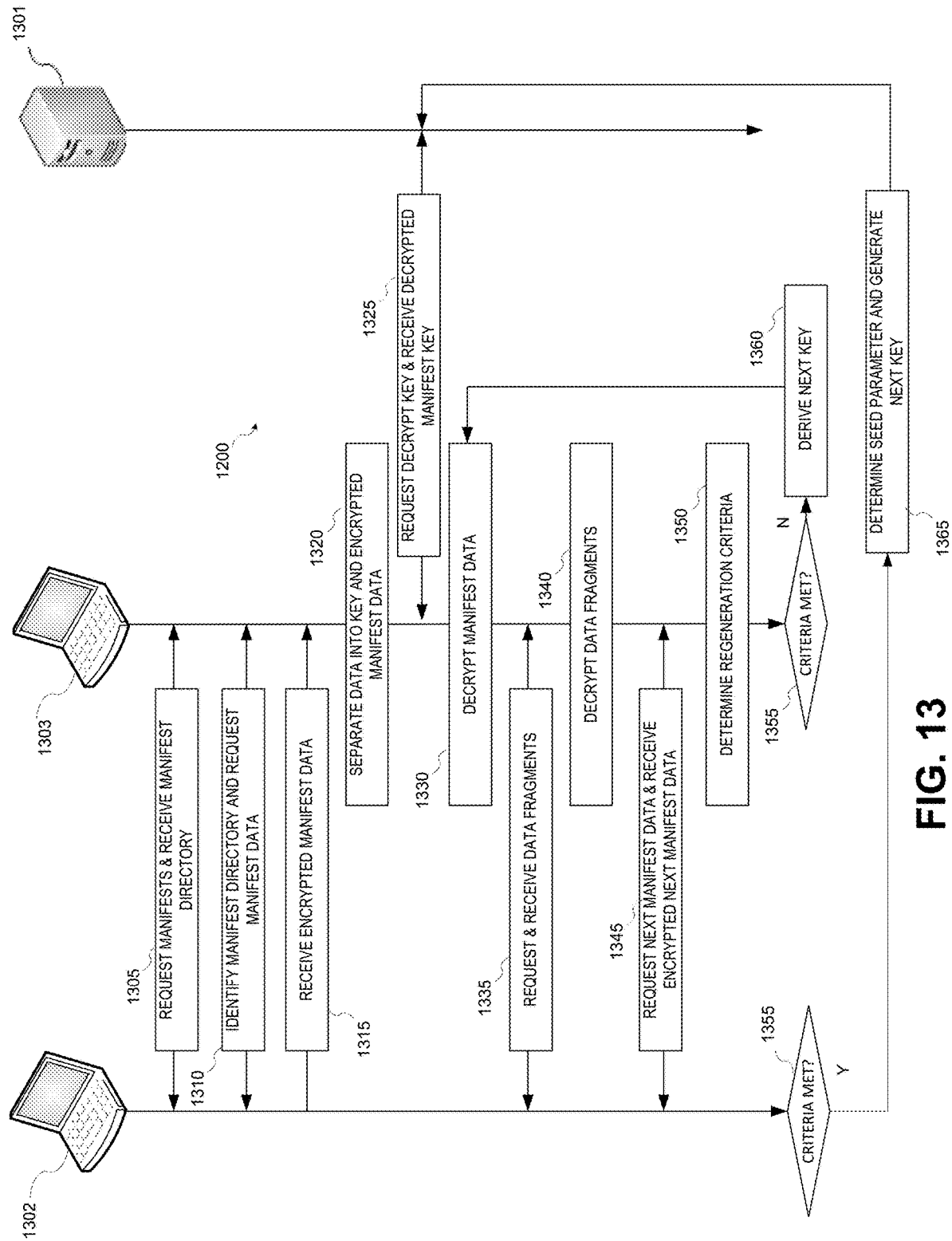
FIG. 13 is a sequence diagram illustrating an encrypted data transmission sequence in accordance with various aspects of the present disclosure.

FIG. 13 is a sequence diagram illustrating an encrypted data transmission 1300 in accordance with various aspects for the present disclosure. Referring to FIG. 13, at block 1305 client software running on client endpoint device 1303, communicatively coupled with the server 1301, starts the sequence 1300 by requesting a data object. In some embodiments, block 1305 includes requesting manifest information from device 1302. The device 1302 responds by providing a summary of available manifest data stored thereon. For example, the device 1302 may provide a summary (e.g., catalog) of some or all of the manifest data available via data director structures (e.g., directories 1242*a-n* of FIG. 12). As an example, where the data object is stored based on timestamp information, device 1302 may provide a summary of the available manifest based on the timestamps, for example, as a list of the timestamp directories.

At block 1310, the device 1303 identifies a first manifest, for example, the manifest associated with the desired data sequence. The device 1303 may then request the manifest. For example, a message may be transmitted from device 1303 including information representative of the desired manifest directory, for example, by including the directory naming convention. In some embodiments, the desired manifest may be identified by an end-user at a terminal and/or an automated system retrieving data from a remote device. For example, the device 1303 may request a list of all time-segments where data exists. The device 1302 may respond and provide the list of manifest directory names which include the timestamp. The request may correspond to a specific time period. The requests could be a user at a terminal or automated system retrieving data from the remote device.

At block 1315, device 1302 sends the requested manifest encrypted by the device 1302 to generate an encrypted manifest dataset. For example, the manifest may be encrypted using a symmetric key (e.g., MK). In some embodiments, the symmetric key (MK) may also be encrypted using an asymmetric key of the device 1302 (e.g., OPPub) to generate encrypted manifest key (e.g., $eMK_a$). The encrypted manifest and encrypted manifest key may be transmitted to device 1303 at the same time in the same transmission, at the same time in different transmission along one or more communication pathways, or at different times and/or different pathways.

At block 1320, device 1303 separates the encrypted manifest key from the encrypted manifest dataset and requests the decrypted manifest key at block 1325. For example, the device 1303 may send the encrypted manifest key ($eMK_a$) to the server 1301 for decryption, which may use the private portion of the asymmetric key (e.g., OPPriv) to decrypt $eMK_a$ and return symmetric key $MK_a$. At block 1330, device 1303 decrypts the manifest dataset using the symmetric key, requests the corresponding fragments at block 1335, and decrypts the data fragments using the keys included in the decrypted manifest at block 1340.

At block 1345, the device 1303 may request the next manifest, which is received from the device 1302. In some embodiments, the block 1345 may be via the same transmission as block 1335, at the same time as block 1335, before and/or after block 1335, or along a different communication pathway than block 1335. Device 1302 may then transmit the requested data fragments and/or manifest to device 1303.

At block 1350, key regeneration criteria are determined. The regeneration criteria may indicate whether the manifest keys should be regenerated. In various embodiments, the key regeneration criteria may be evaluated for each manifest, for example, of a given data sequence of requested data. At block 1355, it may be determined whether the key regeneration criteria is met. For example, the determination may be based on whether an encryption algorithm has run its course.

An example of key regeneration criteria not being met may be, for example, that decrypted data fragments in block 1335 and/or the decrypted manifest from block 1330 may indicate that another data block (e.g., directory 1232*b* where the decrypted fragments are included in 1232*a*) is part of the requested data object. In this case, at block 1360, a new key may be generated by the device 1303 based on the encryption algorithm and parameters related thereto. For example, the encryption algorithm parameters may comprise a ratchet function as described above. Device 1303 may ratchet the symmetric key to a next symmetric key ($MK_{a+1}$) and proceed back to block 1330. The process may repeat until $eMK_{a+x}$ is reached, and no more manifests keys can be derived using the ratchet function. Once the device 1303 has decrypted the data fragments and reassembled the data object, the data object can then be forwarded to an appropriate client, container, or additional device. In some embodiments, device 1303 may store the data object in accordance with various aspects disclosed herein, for example, on-premise described in connection to FIG. 11. In some embodiments, alternatively or in combination, the device 1303 may transmit the data object to another device, for example, in accordance with the methods described herein.

In response to determining that the key regeneration criteria are met (1355—Y), at block 1365 the server 1301 may determine a next manifest key. For example, the device 1302 may determine a seed parameter for the next manifest key based on an encryption algorithm, which may be provided to the server 1301 and the sequence may repeat. In some embodiments, the next manifest key may be based in part on the previous manifest key. For example, a next encrypted symmetric key ($eMK_b$) may be generated by device 1302 according to various aspects of the present disclosure, which is decrypted by the server 1302 using the private portion of the asymmetric key (OPPriv) to retrieve $MK_b$ for subsequent use in a repeated sequence 1300. In some embodiments, the device 1302 may utilize the same or a different encryption algorithm (e.g., a DHE exchange protocol) to determine a seed parameter for the next key.

In some embodiments, the device 1303, device 1302, and server 1301 may establish one or more trusted connections between each other (e.g., between device 1303 and 1302, between device 1303 and server 1301, and between device 1302 and server 1301). An example method for establishing a trusted connection is described below in connection to FIG. 14. However, other methods of authenticating each respective device for communication on the network and communication there between are possible.

In some embodiments, the private portion of the symmetric key used to decrypt the manifest key (e.g., OPPriv) is only stored in a data storage device connected to the server 1301 *a*. Thus, only those devices having been authenticated to access server 1301 may perform sequence 1300. Furthermore, in various embodiments, using the ratchet function to calculate the next manifest key ($MK_a$, $MK_{a+1}$, $MK_{a+x}$, etc.) may reduce network and/or bandwidth demand on server 1301 since the server 1301 is implemented for decrypting keys only once the regeneration criteria is met (e.g., no further manifest keys can be derived using the ratchet function).

Various embodiments described herein may be configured to support multi-cast environments to perform the sequences and method described herein. For example, multiple transmission and/or multiple communication pathways may be used to transmit the various data fragments, manifest data, and/or various encryption keys to the requesting device. In some embodiments, to support multi-cast, a unique symmetric key (e.g., a shared key) may be used between each sender and receiver combination. Transmission of data may utilize the symmetric key to encrypt the manifest data. The data fragments may already be encrypted as described herein and do not need additional encryption before being sent (e.g., in block 1335). In these embodiments, receiver devices can be dynamically added to access data streams in progress and other participants need not regenerate their own keys due to addition of another device.

viii. Encrypted Data Transmission to Remote Device

In accordance with various embodiments described in the present disclosure, secured fragments of a data object may be transmitted to a remote device for sequenced viewing or playback, for example, by retrieving and decrypting the secured fragments upon reception at a remote device from a first device (e.g., client endpoint device 110). For example, the processes described herein may be used to stream a secured data object for live viewing at a remote endpoint. In some embodiments, the processes described herein may be used to securely store a stream of the data object on-premise (e.g., as described above in connection to FIG. 11), as well as streaming a secured data object for live viewing at a remote endpoint. In some embodiments, the data object may be recorded on-premise, while simultaneously streaming an encrypted data object to the receiver device. For example, process 1100 may be performed in parallel with one or more of the processes and sequences described below, for example, in connection with FIGS. 14 and 15.

In various embodiments, the plurality of fragments and associated manifests can be transmitted in any order over any network or communication pathway. Accordingly, another example advantage that inures from the fragmentation of data and creation of manifests as described herein is the ability to leverage multi-cast environments, as described above. Such environments may be less taxing on computer resources, thereby facilitating low latency and full data encryption. Additionally, multi-cast environments may provide improved security may be achieved since fragments of the data object can follow different network paths and the logical order would not be obvious to an interloper.

In some embodiments, systems according to the various aspects of the present disclosure may be configured to monitor the transmission between devices, as described above. By monitoring the transmission, the systems described herein may determine a performance characteristic for the plurality of communication pathways and prioritize communication pathways based on determined relative performance.

Figure 14:
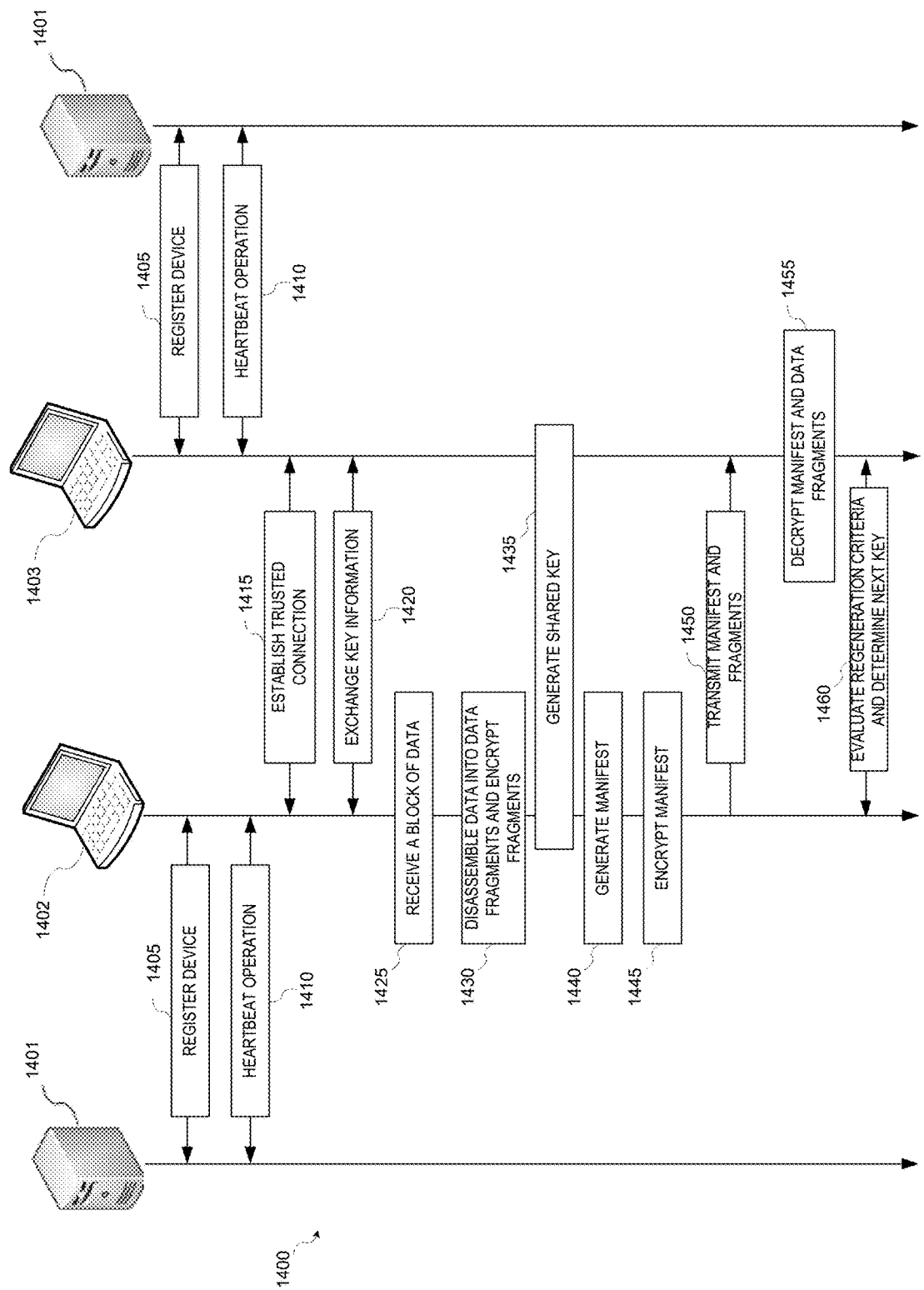
FIG. 14 is a sequence diagram illustrating an encrypted data transmission sequence in accordance with various aspects of the present disclosure.

FIG. 14 is a sequence diagram illustrating an encrypted data transmission sequence 1400 in accordance with various aspects of the present disclosure. In some embodiments, sequence 1400 may be used to securely store a data object on a first device, as well as transmit secured data as a data stream to a remote device, e.g., a second device. Thus, the second device may receive and playback the streamed data object in real-time. In some embodiments, sequence 1400 may be implemented to simultaneously receive or capture data at the first device for secure storage as described here, as well as, either alone or in combination, securely transmit a data stream of the captured data to a second device simultaneously with capture or at a point of time subsequent to receiving and/or capture.

Referring to FIG. 14, at blocks 1405, when a new device is added to the network, that device may be registered with server 1401 (e.g., servers 120, 180, and 1901 as described herein) to authenticate that device. In various embodiments, registering each device may comprise retrieving identifying information from each device and storing the identifying information with the server 1401. In some embodiments, during registering with the server 1401, a plurality of encryption keys may be communicated and installed on each device. An example registration of a new device is described above in connection to FIG. 7.

At block 1410, a heartbeat operation may be executed by each client. In some embodiments, the heartbeat operation 1410 may be executed upon boot up of a respective device and/or at intermittent time intervals during operation. Each heartbeat operation 1410 may include transmission of a signal and/or data packet from a client that includes a last valid command (e.g., recording, transmitting, etc.). In some embodiments, the signal may also comprise one or more portions of the identifying information. Reception of this signal at the server may be indicative that the device 1410 is operating and ready to send or receive data. In some embodiments, the server 1401 may receive identifying information with the heartbeat operation and use this information to identify the device.

As described above, when a new device is added to the network, there needs to be a way to authenticate that device. For example, after a device is registered with the server, a trusted connection may be required between the device and server and between the device and any other device that may communicate with the device in accordance with present disclosure. Thus, in various embodiments, a trusted connection may be established, for example, through an exchange of keys.

For example, at block 1415, clients 1402 and 1403 may create a trusted connection between each other. In some embodiments, the devices execute a protocol comprising an exchange of asymmetric keys. Through the exchange of asymmetric keys, each device may verify that the other device is authenticated for operation on the network via server 1401. In some embodiments, the exchanged keys may be signed by a public key of the server 1401. Following the block 1415, a trusted connection has been created between the clients 1402, 1403 and information can be sent in either direction.

In some embodiments, either as part of block 1415 or a separate operation, the clients 1402, 1403 may be configured such that messages exchanged between devices is received at the proper location. In some embodiments, the client 1403, coupled to an application for executing the data object, may be configured with a host address of device running client 1402. Similarly, client 1402 may be configured with the host address and a designated port of the device corresponding to client 1403. The host address may be, for example, an IP address of the respective client. In some embodiments, the client 1402 may ping the host address specified in its configuration to verify the address is associated with the client 1403, and the client 1403 may similarly verify the address of client 1402. In some embodiments, the ping operation may be similar to the heartbeat operation described herein.

At block 1420, the clients 1402 and 1403 may exchange key information, for example, based on an encryption algorithm and seed parameters (e.g., regeneration criteria). In some embodiments, the exchanged key information in block 1420 may be used to generate a shared key as described below.

At block 1425, the client 1402 receives a block of data. Receiving a block of data may refer to receiving data from a remote device, retrieving from a local or remote data storage, capturing data using a data capture device (e.g., a camera, audio recorder, etc.), or other means of acquiring data for encryption and transmission in accordance with the disclosure herein. In some embodiments, a block of data may refer to a portion of an entire data object, for example, a frame of a video stream, a sample of audio, etc., from a source which could be a file or data sensors including, but not limited to cameras, video, and/or audio sensors. At block 1430, the client 1402 disassembles the block of data into data fragments and encrypts the data fragments in accordance with the embodiments described herein. For example, the data fragments may be encrypted using unique keys. In some embodiments, the data fragments are encrypted using random keys for each data fragment, such as for example, a random symmetric key.

At block 1435, the clients 1402, 1403 use the exchanged key information from block 1420, to create a unique shared key for device 1402, 1403 based on, for example, a first encryption algorithm and a current seed parameter. In various embodiments, as described below, both clients may rotate their respective shared keys at an agreed upon interval. The interval may be controlled, for example, by server 1401 or device settings and configuration (e.g., during registration and/or at a subsequent point in time) or dynamically adapted based on threat and security levels. For example, threat and security levels may be generated by any number of external services such as third-party monitoring software, automated threat detection software, traffic and log file analyzers, or manual intervention, etc. This in turn can notify server 1401 to change its algorithm based on security parameters which may be stored in a configuration file. While block 1435 is illustratively described as following block 1430, it will be understood that block 1435 may be executed earlier or later in sequence 1400. For example, block 1430 may follow block 1420, before or in parallel with one or more of blocks 1425 and/or 1430.

At block 1440, the client 1402 generates manifests, which contain, among other data, the unique encryption keys for each of the data fragments. While block 1440 is illustratively described as following block 1435, it will be understood that block 1440 may be executed earlier or later in sequence 1400. For example, block 1440 may follow and/or run in parallel with block 1430. At block 1445, the client 1402 encrypts the manifests, for example, using the unique shared key of device 1402 generated in block 1435.

At block 1450, the encrypted manifests for each data fragment and corresponding fragments are transmitted, for example, from the client 1402 to client 1403, in accordance with the embodiments described herein. Client 1402 awaits receipt of the manifest and decrypts the manifest using the unique shared key at block 1455. Also, at block 1455, client 1403 decrypts the data fragments using the using unique keys contained within the decrypted manifest. In various embodiments, the client 1403 may receive the manifest before, at approximately the same time, or after receiving one or more data fragments. Each data fragment and/or block of data fragments may be received in any order. At block 1460, each client 1402, 1403 evaluates regeneration criteria and determines to the next shared key.

In some embodiments, the regeneration criteria that indicate whether the key is to be regenerated are based on, for example, a second encryption algorithm. In some embodiments, determining to generate the shared key is based on whether the second encryption algorithm has run its course and no further keys may be derived therefrom. In some embodiments, the second encryption algorithm is a ratchet function. For example, a share key may be initially derived using a first encryption algorithm and seed parameter (block 1435), and a second encryption algorithm may be used to evaluate whether regeneration of the shared key is required (block 1460). If not required, the sequence returns to block 1435 and a next shared key are derived using the second encryption algorithm. If regeneration is required, the first encryption algorithm may be used to derive a next seed parameter from which the next key may be generated. In some embodiments, the first encryption algorithm may be the DHE key exchange protocol, from which seed parameters for generating shared key may be based upon. Parameters for using the DHE protocol may be included, for example, with the previous manifest. In some embodiments, the second encryption algorithm may be a ratchet function as described herein.

While sequence 1400 is described above in connection to clients 1402 and 1403 running on respective devices, such description is for illustrative purposes only. For example, one or more of the blocks of sequence 1400 may be performed by the server 1401. For example, the server 1401 may be configured to execute any of the blocks through, for example, an application interface running on the devices. Furthermore, one or more blocks of sequence 1400 may be performed via a client associated with a subscribed user operating on different device (e.g., an authenticated computer and an authenticated mobile device configured to run the client).

Figure 15:
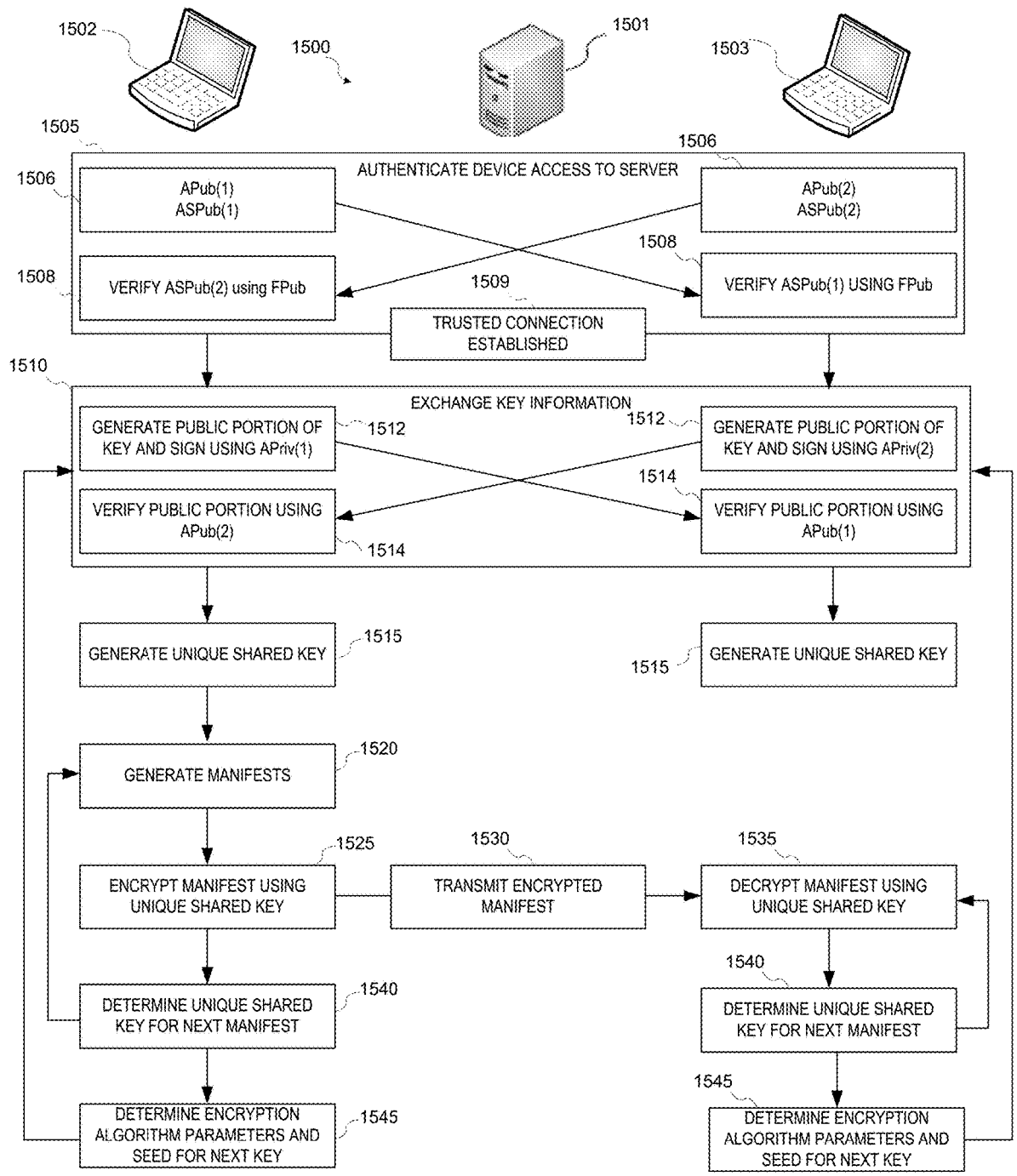
FIG. 15 is a sequence diagram illustrating a key exchange sequence in accordance with various aspects of the present disclosure.

FIG. 15 is an example sequence diagram illustrating another example exchange of key information sequence 1500 for secure transmission of manifests in accordance with various aspects of the present disclosure. Server 1501 and clients 1502, 1503 may be substantially similar to the servers and client endpoint devices described throughout this disclosure and configured to perform the processes described herein. One or more aspects of FIG. 15 may be implemented during sequence 1000.

In various embodiments, any two devices that have been registered in accordance with the various aspects of the present disclosure may be configured to establish a trusted connection between each other via a client running on each device. For example, as described above in connection to FIG. 15, each registered device comprises a plurality of encryption keys including at least FPub, APiv, APub, ASPub, and OPPub if configured for on-premise recording. As used herein, "(1)" refers to the encryption keys stored on or received from the client 1502 and "(2)" refers to the encryption keys stored on or received from the client 1503. In some embodiments, client 1502 may be running on a "receiver" device, that is, for example, a device coupled to a data acquisition device such as a camera or audio recorder. In some embodiments, client 1503 may be running on a "viewer" device, that is, for example, a device comprising an application for presenting, displaying, playing, etc. the data object.

At block 1505, each client 1502, 1503 transmits encryption keys for authenticating the other device and confirms that the other device has the proper permissions for operating on the server 1501. For example, client 1502 may transmit its APub(1) and ASPub(1) to client 1503 and vice versa, at blocks 1506. At blocks 1508, each client 1502, 1503 may verify the received ASPub using FPub. In some embodiments, each client may determine that the signature of the received ASPub, as described above in FIG. 7, matches the FPub stored with each client 1502, 1503. If the signature matches the FPub, each client determines the other client is trusted for communication via the network and establishes a trusted connection at block 1509. In some embodiments, the trusted connection may comprise a plurality of communication pathways in accordance with the aspects of the present disclosure. In some embodiments, block 1505 may be performed at block 1015 of FIG. 10.

At block 1510, the clients 1502, 1503 are configured to exchange key information. At block 1512, each client 1502, 1503 may be configured to generate a unique asymmetric key pair using a key exchange solution algorithm and sign the public portion with its APriv. For example, client 1502 may generate an asymmetric key pair based on current first encryption algorithm. A non-limiting example of such an algorithm is a DHE key exchange algorithm. The public portion of the asymmetric key generated in block 1512 is signed with APriv(1), and the signed public portion of the asymmetric key (e.g., DHE in some embodiments) is sent to the client 1503. The client 1503 may execute a similar algorithm to generate and transmit a signed public portion of a DHE to the client 1502. At block 1514, each client 1502, 1503 may verify the received public portion using the APub of the transmitting client, for example, client 1502 may use the received APub(2) to verify the public portion while client 1503 uses the received APub(1). In some embodiments, block 1510 may be performed at block 1020 of FIG. 10.

At block 1515, both clients 1502, 1503 may be configured to generate a unique shared secret key based on the first encryption algorithm and a seed in accordance with the aspects described in the present disclosure. For example, each device 1502, 1503 may use the public portion of the asymmetric key received at block 1514 as a seed to generate a shared symmetric key ($MK_a$). In various embodiments, the unique shared key may be the same symmetric key based on usage of the same encryption algorithm and seeding parameter. Advantageously, the unique shared key may be generated without ever having to transmit the unique shared key between devices.

In various embodiments, using a unique shared key to encrypt the manifest data may facilitate multi-case implementations. As described above, the data fragments are already encrypted and do not need additional encryption before being sent. This allows receivers to be dynamically added to access data streams in progress and other devices need not regenerate their own keys.

In various embodiments, now that the connection has been created between the devices 1502 and 1503, information can be sent in either direction. Both devices may be configured to rotate their respective shared keys at an agreed interval, which can be controlled via system or device settings and configuration or adapt based on threat and security levels. In some embodiments, the agreed upon interval may be set in a security model configuration file that controls the frequency a shared key is re-seeded. In some embodiments, the minimum frequency that the key is re-seeded may be set by the security model.

For example, returning to FIG. 15, at block 1520, device 1502 may generate manifests in accordance with the various aspects of the present disclosure. The device 1503 may request manifests and/or a data object, for example, using a process similar to that described above in connection to FIG. 13. At block 1525, device 1502 encrypts the manifest using the shared key. For example, manifest ($M_x$) is encrypted using shared key ($MK_x$) to generate encrypted manifest ($eMK_x$). At block 1530, the encrypted manifest ($eMK_x$) is transmitted to device 1503, which is configured to decrypt $eMK_x$ using the shared key $MK_x$. Both devices may then rotate their respective shared key according to current second encryption algorithm at block 1540 and generate a next unique shared key. For example, the shared key may be determined via ratchet function as described above (e.g., $MK_{x+1}$=ratchet($MK_x$,1)).

The sequence may then return to block 1520, where the next manifest ($M_b$) is generated and/or retrieved from storage and repeated for each shared key. When regeneration criteria is met (e.g., no further manifest keys may be derived using the second encryption algorithm), the devices 1504, 1503 may determine a seed for the next unique shared key, for example, based in part on the first encryption algorithm. In some embodiments, the next unique shared key may also be based on the previous shared key. The sequence 1500 then returns to block 1510, where the seed and first encryption algorithm parameters are used to generate a new public portion of the asymmetric key at block 1512 and the public portion of the asymmetric key is used as a seed for a new unique shared key (e.g., $MK_b$) at block 1515.

In various implementations, one or more external storage devices may be coupled to one or more devices and configured to execute one or more aspects of processes and/or sequences described herein. That is, an external storage device may be inserted into an interface of a device running the client to execute one or more blocks or steps described herein. For example, a USB drive (or other external storage device) may be inserted into a USB port or other interface. The USB drive may comprise instructions for performing one or more operations. In some embodiments, the instructions stored on the USB drive may be executed by the device (e.g., a processor therein) automatically in response to the client on the device recognizing that the USB is so coupled to the device. In some embodiments, a USB drive in accordance with the disclosure herein may be configured to modify the host address and/or port information used to configure the client or adapt the security model to modify encryption algorithms implemented in the processes described herein. For example, the USB may comprise configuration file of the connected device and/or replace the existing configuration file with a new file, which may be installed based on insertion of the USB. In some embodiments, a USB may be configured to delete and/or move previously stored data objects and/or data fragments from current storage locations and/or virtual cryptological containers. Configuring a USB in this way may provide a benefit by minimizing or removing the need for a monitor, keyboard, or mouse input to perform these operations; thus, providing flexibility for in-field configuration changes.

In some embodiments, a client may transmit interpretation data to another client. The interpretation data may comprise data object execution parameters that may be used by a receiving client to interpret received data elements and execute the reassembled data object. For example, in some scenarios, a first client may transmit a video stream in accordance with the various aspects of the present disclosure. A second client may not reliably interpret the incoming data where, for example, the client receives data fragments corresponding to the middle of the video stream (e.g., middle of playback) prior to receiving the sequentially first data fragments. Thus, the client may also transmit interpretation data to the second client that can be used to interpret the data and facilitate playback. In some embodiments, interpretation data may be transmitted along with manifests and/or data fragments, before transmission manifests and/or data fragments, or after. In some embodiments, interpretation data comprise a predefined file injected into a transmission before the data object is transmitted. Example interpretation data includes, but is not limited to, frame rate parameters, data rate parameters, etc. that can be used, for example, by a camera encoder and/or media player decoder to interpret and reassemble the data fragments.

ix. Control of Remote Device

In some embodiments, a remote device may receive control packets from a client endpoint device as either part of a signal received in connection with one or more of the methods and processes described in the present disclosure or as a separate signal. In various embodiments, the control packets may be encrypted in accordance with one or more of the various aspects described in the present disclosure. Such control packets may allow the client endpoint device to direct and/or control the behavior of the remote device. For example, where the remote device is a camera, the control packet may include instructions for changing focus, resolution, frame rates, data rates, image rotation, etc. In another embodiment, the remote device may be a factory valve control, which could be remotely and securely turned on and off via one or more of the methods and processes described in the present disclosure.

In some embodiments, the remote device can be accessed by another device on the network providing the devices have the proper authentication and permissions. For example, the devices may be registered as described herein and/or a trusted connection may be established. A predefined set of remote commands may be available and understood by the remote units that may allow remote configuration or maintenance activities. These can include, but are not limited to, software upgrades, changes in settings, retrieve data such as sensor or other locally captured or stored data, disk cleanup, initiate recording or transmission, or other similar activities.

In some embodiments, control commands may be sent through a server, for example, the servers described herein. In some embodiments, alternatively or in combination, control commands may be received directly from a controlling device, for example, following establishment of a trusted connection. Additionally, to verify authentication and permissions, the control commands may be signed and/or encrypted using one or more of the key exchange methodologies described herein. Advantageously, in addition to making sure that the commands are created and signed from a trusted device, such arrangements may provide a centralized location for making sure actions are appropriate and can be logged for historic purposes. If a remote client cannot verify the signature of commands using a corresponding key (e.g., FPub, MK or the like), then an error can be logged, and the control packet may be rejected by the server or controlled device. In some embodiments, the systems and devices described in the present disclosure may be configured to remotely enable and disable capabilities of clients of any device that is running the software described herein. For example, a device may connect to and control one or more remote devices, and through remote provisioning, this capability can be enabled, disabled, or enabled with limited capabilities for any individual device, group of devices, specific users, or groups of users. To accomplish this, the client may be configured to perform a request for permissions and capabilities at various times while running. For example, the client may execute a process to establish or otherwise verify that a trusted connection is in place and/or maintained. Results of such a request may include information about the permissions (e.g., keys and/or signed verifications) for the user and/or device so that server may allow or restrict specific capabilities as described above.

x. Example Client Implementation

In some embodiments, access to the system can be provided by a client running on the endpoint 110. For example, access may be provided by an application interface (e.g., APIs and/or SDKs) through software running on endpoint 110, or through an application running on a portable electronic device such as a tablet or smartphone. Additionally, the system can be accessible over a web-based application interface, where all of the user's information is securely stored, e.g., in a secure server facility in a cloud-based network, For example, a client can be loaded to a device 110, such that data can be saved to and retrieved from different portions of local or locally connected storage device 140 described in the Related Applications or such that the data can be saved and stored to a plurality of storage devices 140-170.

FIGS. 16A-16F illustrate example screen shots of a graphical user interface for interacting with a client installed onto a user device, through which a user can interact with the systems in accordance with the disclosure herein. The graphical user interface of FIGS. 16A-16F may be displayed on a display device including, but not limited to, a touch-screen display of a mobile device, computer monitor, TV, a laptop display screen, or any other display device that may be apparent to a person of ordinary skill in the art. For example, the graphical user interface may be executed by a mobile device communicatively coupled to the systems described herein. In some embodiments, the mobile device may be operating an operating system, such as but not limited to, Android by Google, iOS by Apple, etc.

In various embodiments, the user of the device may be required to authenticate themselves to access the client. For example, as described above, when paired with a remote key server, the system may be configured to transparently authenticate the user and retrieve the corresponding key(s) on a per-file and/or per-access basis.

After a successfully authenticating the access to the client, the application may generate screen 1600A. Screen 1600A comprises navigation bar 1610 illustratively disposed along a lower edge of the screen 1600A; however, the navigation bar 1610 may be positioned anywhere within the display. The navigation bar 1610 may comprise a plurality of icons, for example, an icon 1611 for accessing a home screen (not shown); an icon 1613 for generating a data object; an icon 1615 for accessing a profile screen (not shown), and an icon 1620 for accessing a virtual cryptological container screen 1600A to facilitate selection of a virtual cryptological container as described above and in the '123 application. In various embodiments, a data object generated via icon 1613 may also be stored on-premise in local or locally connected storage devices (e.g., as described above in connection to FIG. 11) as well as streaming a secured data object for live execution at a remote endpoint (e.g., as described in connection to FIGS. 14 and 15).

Screen 1600A also illustrates a search bar 1622 and a list of a plurality of virtual cryptological containers 1624A-N. The virtual cryptological containers 1624A-N may be substantially similar to the virtual cryptological containers described above and in the '123 application and '058 applications. From screen 1600A, a user may interact with the device to select a virtual cryptological container for secure storage of data. The user may interact with the device by, for example, interacting with a touch screen via a finger press, voice command, or other input device (e.g., I/O interface 585 of FIG. 6).

Once a user selects a virtual cryptological container from the list, the application may generate screen 1600B. Screen 1600B illustrates a graphical interface representative of data objects securely stored in the selected virtual cryptological container. For example, in the illustrative embodiment the user may select virtual cryptological container 1624A. Thus, screen 1600B illustrates the data object 1627 securely stored in virtual cryptological container 1624A, for which the user is authorized to access. The data object 1627 may be stored via on-premise storage as described in connection with FIG. 11.

Figures 16A, 16B:
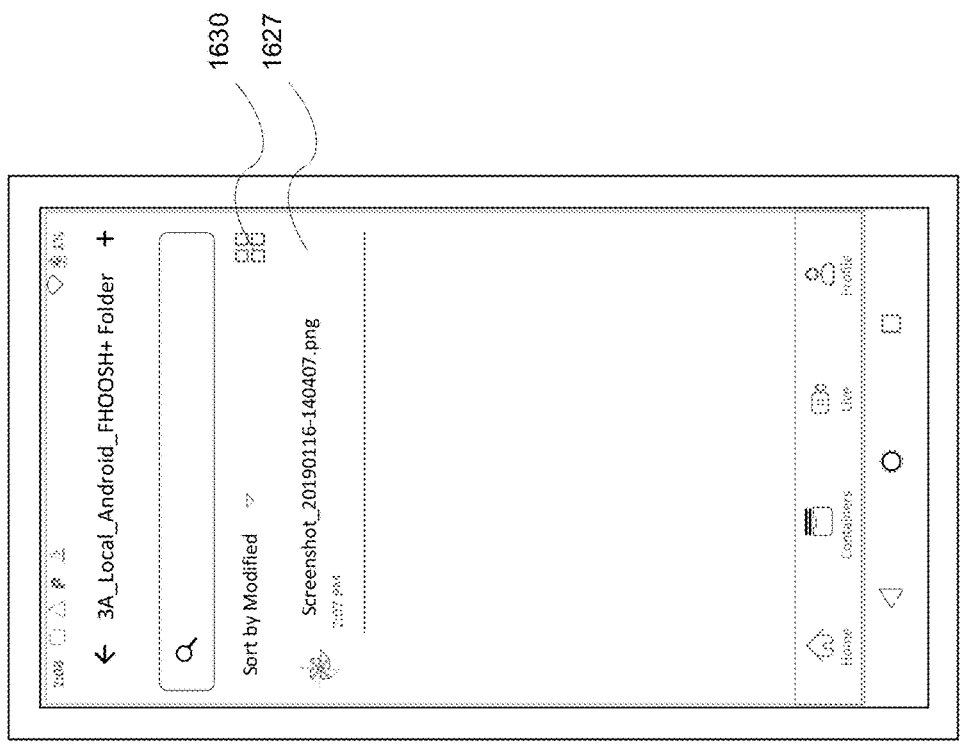
FIGS. 16A-16F are example screen shots of a display of a device for executing the methods and sequences in accordance with various aspects of the present disclosure.
Figure 16D:
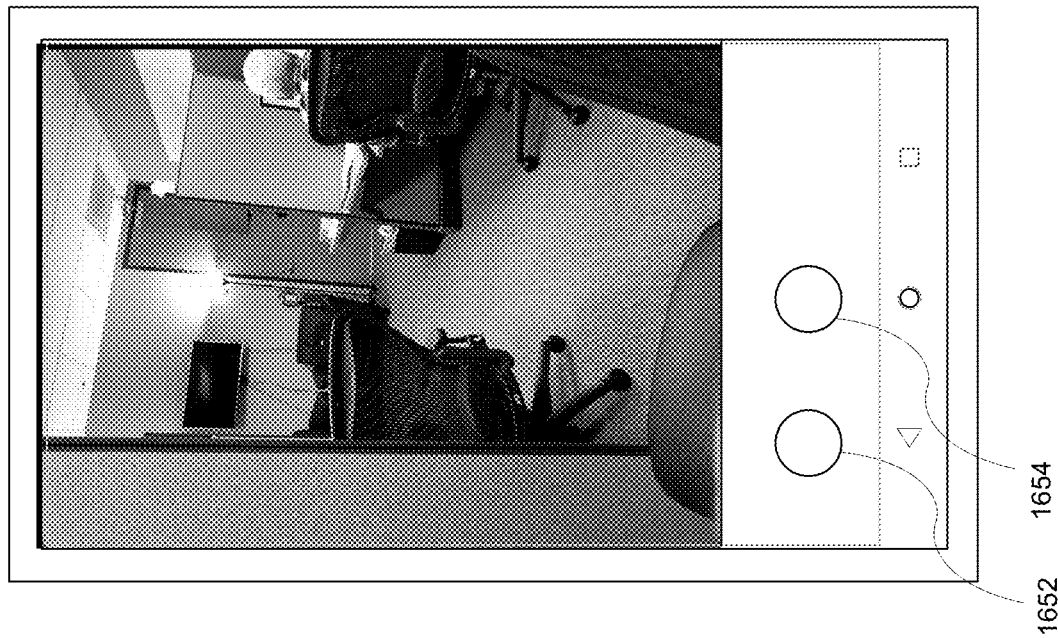

In some embodiments, if the user is not authorized to access the selected virtual cryptological container, the selected virtual cryptological container may appear empty at screen 1600B. In some embodiments, if the user is not authorized to access virtual cryptological container 1624A, screen 1600B may not be generated and the user not permitted to view contents therein. In some embodiments, only those virtual cryptological containers that the user is authorized to access may be displayed at screen 1600A. While one data object is shown in FIG. 16B for illustrative purposes, it will be understood that any number of securely stored data objects may be displayed.

The user may interact with the data object 1627 to generate a command to access the protected data object. For example, the application may generate screen 1600B, through which a user may locate an on-premise data object 1627 stored in virtual cryptological container 1624A to be accessed for viewing, interacting with, and/or storage for full accessibility by the user. Alternatively, alone or in combination, the data object 1627 may also be illustrative of a data object available for streaming from a remote device, for example, in accordance with FIGS. 14 and 15.

Figure 16C:
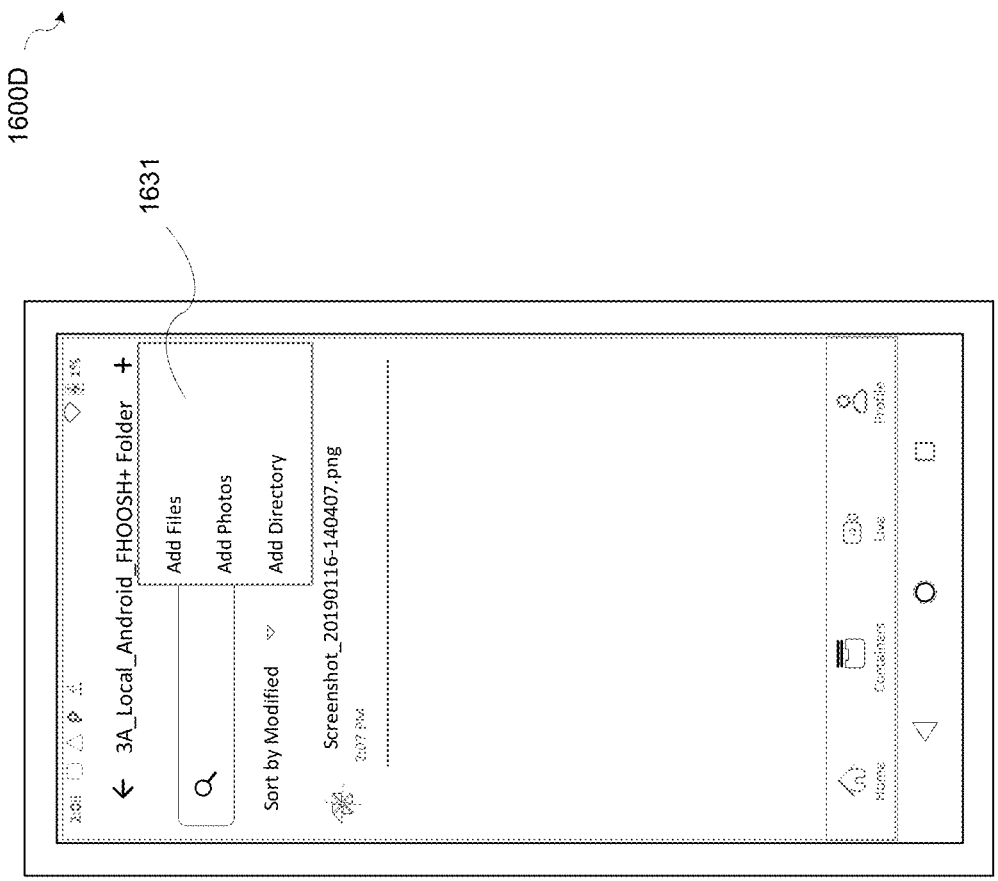

In some embodiments, the user may interact with screen 1600B to select data for on-premise storage within the selected virtual cryptological container in accordance with the disclosure herein. For example, a user may interact with icon 1630 to access a menu 1631, for example as illustrated on screen 1600C of FIG. 16C, for identifying one or more data objects for storage within virtual cryptological container 1624A. User interaction with icon 1630 may bring up a drop-down menu 1631 shown in FIG. 16C, which includes various data types for storage. For illustrative purposes, FIG. 16C depicts data types, including but not to be limited to, files, photos, and directories that may be selected for secure storage. However, other data types may be accessed via menu 1631, for example, videos, software, documents, etc. Furthermore, selecting the directories option may navigate the user to another list of directories from which the user may identify a desired directory. Then the user may select one or more data objects therein for secure storage via the application.

Figures 16E, 16F:
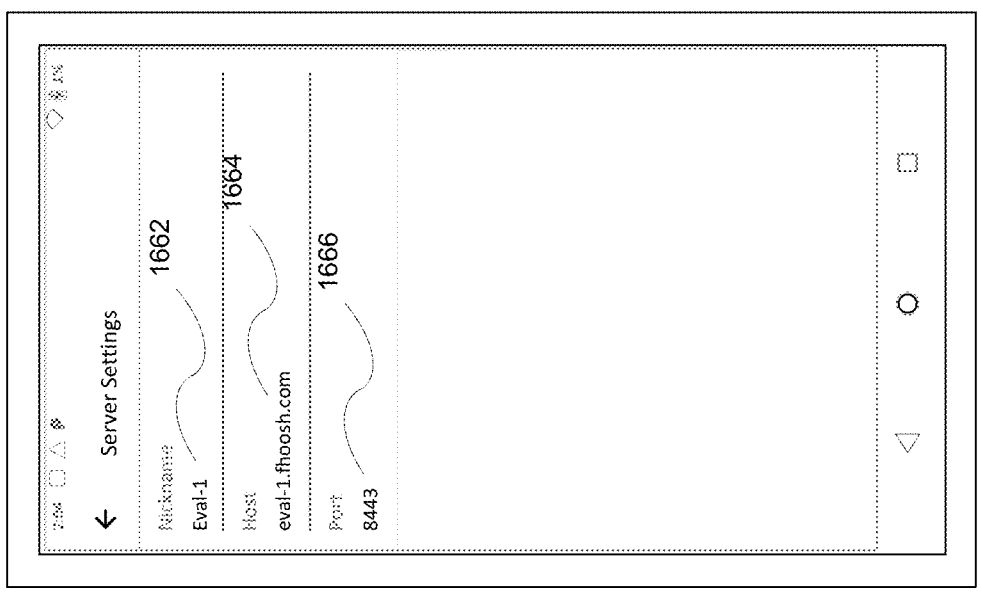

FIG. 16E illustrates a screen shot of a screen 1600D that may be accessed via icon 1613. Screen 1600D illustrates a data capture of, for example, an image frame captured by a camera coupled to the mobile device. In some embodiments, screen 1600D may illustrate an image capture of a picture. In another embodiment, screen 1600D may illustrate a single image frame of a video capture.

Screen 1600D comprises icon 1654, which may be configured to initiate capture of a data object. In some embodiments, interacting with icon 1654 may cause the application to execute on-premise storage of the data object in parallel with data capture (e.g., in accordance with FIG. 11). In some embodiments, alone or in combination, interacting with icon 1654 may also cause the application to execute data object streaming in accordance with FIGS. 14 and 15. Screen 1600D, in some embodiments, may also include icon 1652 which may cause the application to use a secondary data capture device. For example, the mobile device may be coupled to a first and second camera and icon 1652 may facilitate selection of a camera of data collection, for example, between a front and rear camera. In another embodiment, icon 1652 may facilitate selection between a camera and an audio recorder or other data capture device. In yet another embodiment, icon 1652 may facilitate selection of a remote data capture device connected to the device via wired and/or wireless connection (e.g., a camera or other device remote from the device connected via standard cable, Bluetooth, etc.).

In some embodiments, icon 1615 may provide access to one or more preference screens, for example, screen 1600E and/or 1600F. For example, the user may interact with icon 1615 and navigate to screen 1600E or 1600F. In some embodiments, an intermediate screen may be presented from which the user may navigate to the desired screen.

FIG. 16E illustrates a screen shot of a screen 1600E for viewing, modifying, or entering certain parameters for reception and/or transmission of protected data objects via the application. For example, screen 1600E may provide access to settings and configuration information of a remote device. From screen 1600E a user may be able to view the configuration file for communicating with the remote device, for example, the IP address 1640 and/or port number 1642 of a receiving or transmitting device. From this screen 1600E, parameters of the data object may also be viewed and/or entered. For example, a resolution parameter 1644, a data transfer rate 1646, and/or a frame rate 1645. In some embodiments, the parameters may be static, while in others the user may be able to modify the parameters. For example, one or more of the parameters may include a plurality of options available via drop down icons 1645, from which a user may select a different parameter.

FIG. 16F illustrates a screen shot of a screen 1600F for viewing, modifying, or entering certain preferences for operation of the application, such as configuration information for accessing a server. In some embodiments, the user may view, modify, or enter the server settings. For example, the server settings screen 1600F may provide the ability to specify one or more servers where user accounts are stored, for example, via a nickname 1662, host address 1664, and port number 1666 of the server.

While the foregoing description is made with reference to a mobile device, it will be understood that the scope of the present disclosure is not so limited and the processes and methods described herein may be performed on any device (e.g., computer, laptop, wearable electronic device, etc.) without departing from the scope of this disclosure.

xi. Additional Features

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed:

1. A method for secured communications between devices, the method comprising:
    establishing communications for data streaming of a data object between a first device and a second device;
    receiving, at the second device, a plurality of datasets encrypted based on a first dataset key derived based, in part, on a first encryption algorithm, each encrypted dataset comprising encryption keys used to encrypt corresponding data fragments constituting the data object;
    decrypting a first encrypted dataset of the plurality of datasets using the first dataset key to retrieve encryption keys for decrypting corresponding data fragments;
    evaluating key regeneration criteria to determine whether the first dataset key should be regenerated for a second encrypted dataset of the plurality of encrypted datasets;
    in response to determining that the dataset key should not be regenerated, determining a second dataset key based, in part, on a second encryption algorithm; and
    decrypting the second encrypted dataset using the second dataset key to retrieve unique encryption keys for decrypting corresponding data fragments.

2. The method of claim 1, further comprising:
    in response to determining that the first dataset key should be regenerated,
    retrieving a third dataset key based, in part, on the first encryption algorithm; and
    decrypting the second dataset using the third dataset key.

3. The method of claim 1, wherein the data object is stored in one or more data storage devices locally connected to the first device, wherein the method further comprises:
    requesting the data object by the second device;
    in response to requesting the data object, receiving the first encrypted dataset; and
    requesting data fragments corresponding to the first encrypted dataset based on decrypting the first encrypted dataset.

4. The method of claim 1, further comprising:
    receiving, by the second device, the first dataset key encrypted using a public portion of an asymmetric encryption key, and
    retrieving the first dataset key from a server configured to decrypt the encrypted first dataset key using a private portion of the asymmetric encryption key.

5. The method of claim 4, wherein the first device and second device are authenticated for communication with the server based, in part, on a public portion of a server asymmetric key.

6. The method of claim 1, further comprising:
    generating the first dataset key, at the second device, based on an exchange of key information between the first and second devices, the key information comprising at least a seed parameter based, in part, on a public portion of an asymmetric key received from the first device and derived from the first encryption algorithm.

7. The method of claim 6, further comprising verifying the key information using a public portion of an authentication asymmetric key, wherein the key information received from the first device is signed using a private portion of the authentication asymmetric key by the first device.

8. The method of claim 1, wherein the first encryption algorithm is based, in part, on a Diffie-Hellman key exchange methodology.

9. The method of claim 1, wherein the second encryption algorithm is based, in part, on a ratchet function using a pseudo random function and a number of steps to execute the ratchet function.

10. A method for secured communications between devices, the method comprising:
    establishing communications for data streaming of a data object between a first device and a second device;
    generating, by the first device, a plurality of datasets corresponding to a plurality of data fragments constituting the data object, each dataset comprising encryption keys used to encrypt the corresponding data fragments;

encrypting a first dataset of the plurality of datasets using a first dataset key derived based, in part, on a first encryption algorithm;
evaluating key regeneration criteria to determine whether the first dataset key should be regenerated for a second encrypted dataset of the plurality of encrypted datasets; and
in response to determining that the first dataset key should not be regenerated, determining a second dataset key based, in part, on a second encryption algorithm.

11. The method of claim 10, further comprising:
in response to determining that the first dataset key should be regenerated, determining a third dataset key based in part on the first encryption algorithm; and
encrypting the second dataset using the third dataset key.

12. The method of claim 11, further comprising:
receiving the data object from a remote data capture device as a data stream of a plurality of portions of the data object;
upon receipt of each portion of the plurality of portions:
    disassembling the received portion into the plurality of data fragments;
    individually encrypting the plurality of data fragments using a plurality of unique keys;
    generating one or more datasets of the plurality of datasets based on the plurality of data fragments and plurality of unique keys;
    encrypting at least one dataset using the first dataset key; and
    storing the encrypted dataset and the plurality of encrypted data fragments in a plurality of different data storage locations.

13. The method of claim 11, wherein the data object is stored in one or more data storage devices locally connected to the first device, wherein the method further comprises:
receiving a request for the data object from the second device;
in response to receiving the request, transmitting the encrypted first dataset to the second device.

14. The method of claim 11, further comprising:
encrypting, by the first device, the first dataset key using a public portion of an asymmetric encryption key, and transmitting the encrypted first dataset key to the second device.

15. The method of claim 11, further comprising:
generating the first dataset key, at the first device, based on an exchange of key information between the first and second devices, the key information comprising at least a seed parameter based, in part, on a public portion of an asymmetric key received from the second device and derived from the first encryption algorithm.

16. The method of claim 15, further comprising verifying the key information using a public portion of an authentication asymmetric key, wherein the public portion of the asymmetric key received from the second device is signed using a private portion of the authentication asymmetric key by the second device.

17. A system for authenticated communications between devices, the system comprising:
a plurality of devices comprising at least a first and second device;
one or more communication pathways configured to communicatively couple the first and second devices for data streaming of a data object; and
the first device comprising a memory coupled to at least one processor, the first device configured to:
    generate a plurality of datasets corresponding to a plurality of data fragments constituting the data object, each dataset comprising encryption keys used to encrypt the corresponding data fragments,
    encrypt a first dataset of the plurality of datasets using a first dataset key derived based, in part, on a first encryption algorithm, and
    determine a second dataset key based, in part, on at least one of the first encryption algorithm and second encryption algorithm.

18. The system of claim 17, wherein the first device is further configured to:
evaluate key regeneration criteria to determine whether the first dataset key should be regenerated for the second encrypted dataset;
in response to determining that the first dataset key should not be regenerated, determine the second dataset key based, in part, on the second encryption algorithm; and
in response to determining that the first dataset key should be regenerated, determine a third dataset key based, in part, on the first encryption algorithm.

19. The system of claim 17, further comprising:
a remote device communicatively coupled to the first device, the remote device configured to capture the data object as a plurality of portions of data and transmit a data stream of the plurality of portions of data to the first device,
wherein the first device configured to, upon receipt of each portion of the data:
    disassemble the received portion into the plurality of data fragments;
    individually encrypt the plurality of data fragments using a plurality of unique keys;
    generate one or more datasets of the plurality of datasets based on the plurality of data fragments and plurality of unique keys;
    encrypt at least one dataset using the first dataset key; and
    store the encrypted dataset and the plurality of encrypted data fragments in a plurality of different data storage locations.

20. The system of claim 17, further comprising a second device comprising at least one processor, the second device configured to:
decrypt the first encrypted dataset using the first dataset key to retrieve encryption keys for decrypting the corresponding data fragments,
determine the second dataset key based, in part, one at least one of the first encryption algorithm and the second encryption algorithm, and
decrypt the second encrypted dataset using the second dataset key to retrieve encryption keys for decrypting the corresponding data fragments.

21. The system of claim 20, wherein the first and second devices are configured to:
exchange key information between the first device and second device, the key information comprising at least the seed parameter based, in part, on a public portion of an asymmetric key received from the respective device and derived from the first encryption algorithm; and
generate the first dataset key based on the exchanged key information.

22. The system of claim 20, wherein the first device and the second device are configured to each determine dataset keys for the plurality of datasets without exchanging the dataset keys.

23. The system of claim 20, further comprising a server communicatively coupled to the first and second device and configured to install authentication credentials onto the first and second devices, wherein the first device and the second device are configured to authenticate communications with each respective device based on an exchange of the authentication credentials.

24. The system of claim 23, wherein the first device is configured to encrypt the first dataset key using a public portion of an asymmetric encryption key and transmit the encrypted first dataset key to the second device, wherein the second device is configured to request the first dataset key from the server in response to receiving the encrypted first dataset key from the first device, and wherein the server is configured to, in response to receiving the request from the second device, decrypt the encrypted first dataset key using a private portion of the asymmetric encryption key and transmit the decrypted dataset key to the second device.

25. The system of claim 24, wherein the private portion of the asymmetric encryption key is only stored at a storage device coupled to the server.

26. The system of claim 17, wherein the one or more communication pathways comprises a plurality of communication pathways, and wherein the first device is configured to stream data of the data object over the plurality of communication pathways.

27. The system of claim 26, wherein the first device is configured to transmit at least one of one or more data fragments and one or more of the plurality of datasets over different communication pathways of the plurality of communication pathways.

28. The system of claim 26, wherein the first device is configured to transmit at least one of one or more data fragments and one or more of the plurality of datasets over the plurality of the communication pathways approximately simultaneously.

* * * * *